(12) United States Patent
Furukawa

(10) Patent No.: US 9,075,658 B2
(45) Date of Patent: Jul. 7, 2015

(54) APPARATUS AND METHOD OF ASSIGNING JOBS TO COMPUTATION NODES BASED ON A COMPUTATION NODE'S POWER SAVING MODE TRANSITION RATE

(75) Inventor: Eiji Furukawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1543 days.

(21) Appl. No.: 12/405,441

(22) Filed: Mar. 17, 2009

(65) Prior Publication Data

US 2009/0235263 A1  Sep. 17, 2009

(30) Foreign Application Priority Data

Mar. 17, 2008 (JP) .................................. 2008-067714

(51) Int. Cl.
*G06F 9/50* (2006.01)

(52) U.S. Cl.
CPC ............ *G06F 9/5027* (2013.01); *G06F 9/5094* (2013.01); *Y02B 60/142* (2013.01)

(58) Field of Classification Search
None
See application file for complete search history.

(56) References Cited

U.S. PATENT DOCUMENTS

| 7,178,046 | B2 * | 2/2007 | Yamada et al. ................ 713/322 |
| 7,953,957 | B2 * | 5/2011 | Gooding et al. ................ 712/28 |
| 2003/0204762 | A1 * | 10/2003 | Lee et al. ....................... 713/322 |
| 2005/0075837 | A1 | 4/2005 | Espinoza-Ibarra et al. |
| 2005/0166074 | A1 * | 7/2005 | Hack .............................. 713/320 |
| 2005/0246514 | A1 | 11/2005 | Nishida |
| 2006/0095911 | A1 * | 5/2006 | Uemura et al. ................ 718/100 |
| 2006/0136074 | A1 * | 6/2006 | Arai et al. .......................... 700/2 |
| 2007/0180117 | A1 | 8/2007 | Matsumoto et al. |
| 2009/0089792 | A1 * | 4/2009 | Johnson et al. ............... 718/105 |
| 2009/0187782 | A1 * | 7/2009 | Greene et al. ................. 713/340 |

FOREIGN PATENT DOCUMENTS

| JP | 7-326714 A | 12/1995 |
| JP | 2005-115956 A | 4/2005 |
| JP | 2005-316764 A | 11/2005 |
| JP | 2006-146605 A | 6/2006 |
| JP | 2007-179437 | 7/2007 |

(Continued)

OTHER PUBLICATIONS

Merkel, A., Bellosa, F. "Balancing power consumption in multiprocessor systems" Operating Systems Review 40. 4 (Oct. 2006): 403-14.*

(Continued)

*Primary Examiner* — Jacob A Petranek
(74) *Attorney, Agent, or Firm* — Fujitsu Patent Center

(57) ABSTRACT

A management node at first extracts free computation nodes executing none of jobs in order to assign a new job to any one of computation nodes, and specifies a communication target computation node when executing an execution target job. Subsequently, the management node calculates, with respect to all of the computation nodes executing none of the jobs at that point of time, a determination value $V_i$ on the basis of a power saving mode transition rate $S_i$ and an average value $D_i$ of distance counts from the communication target node, and specifies the free computation node having the maximum determination value $V_i$ as the execution target job assignment destination.

12 Claims, 21 Drawing Sheets

(56) References Cited

FOREIGN PATENT DOCUMENTS

| | | |
|---|---|---|
| JP | 2009-510618 A | 3/2009 |
| WO | WO-2007/038530 A2 | 4/2007 |

OTHER PUBLICATIONS

Japanese Office Action mailed Feb. 21, 2012 for corresponding Japanese Application No. 2008-067714, with English-language Translation.

* cited by examiner

FIG. 4

21 : DISTANCE DEFINITION TABLE

|    | 01 | 02 | 03 | 04 | 05 | 06 | 07 | 08 | 09 | 10 | 11 | 12 | 13 | 14 | 15 | 16 |
|----|----|----|----|----|----|----|----|----|----|----|----|----|----|----|----|----|
| 01 |    | 10 | 20 | 30 | 10 | 20 | 30 | 40 | 20 | 30 | 40 | 50 | 30 | 40 | 50 | 60 |
| 02 |    |    | 10 | 20 | 20 | 10 | 20 | 30 | 30 | 20 | 30 | 40 | 40 | 30 | 40 | 50 |
| 03 |    |    |    | 10 | 30 | 20 | 10 | 20 | 40 | 30 | 20 | 30 | 50 | 40 | 30 | 40 |
| 04 |    |    |    |    | 40 | 30 | 20 | 10 | 50 | 40 | 30 | 20 | 60 | 50 | 40 | 30 |
| 05 |    |    |    |    |    | 10 | 20 | 30 | 10 | 20 | 30 | 40 | 20 | 30 | 40 | 50 |
| 06 |    |    |    |    |    |    | 10 | 20 | 20 | 10 | 20 | 30 | 30 | 20 | 30 | 40 |
| 07 |    |    |    |    |    |    |    | 10 | 30 | 20 | 10 | 20 | 40 | 30 | 20 | 30 |
| 08 |    |    |    |    |    |    |    |    | 40 | 30 | 20 | 10 | 50 | 40 | 30 | 20 |
| 09 |    |    |    |    |    |    |    |    |    | 10 | 20 | 30 | 10 | 20 | 30 | 40 |
| 10 |    |    |    |    |    |    |    |    |    |    | 10 | 20 | 20 | 10 | 20 | 30 |
| 11 |    |    |    |    |    |    |    |    |    |    |    | 10 | 30 | 20 | 10 | 20 |
| 12 |    |    |    |    |    |    |    |    |    |    |    |    | 40 | 30 | 20 | 10 |
| 13 |    |    |    |    |    |    |    |    |    |    |    |    |    | 10 | 20 | 30 |
| 14 |    |    |    |    |    |    |    |    |    |    |    |    |    |    | 10 | 20 |
| 15 |    |    |    |    |    |    |    |    |    |    |    |    |    |    |    | 10 |
| 16 |    |    |    |    |    |    |    |    |    |    |    |    |    |    |    |    |

FIG. 5

22 : COMPUTATION NODE MANAGEMENT TABLE

| COMPUTATION NODE | IN-EXECUTION | STANDBY | NORMAL | POWER SAVING |
|---|---|---|---|---|
| 01 | ON | 80 | 110 | 10 |
| 02 | ON | 80 | 100 | 20 |
| 03 | OFF | 150 | 40 | 10 |
| 04 | OFF | 180 | 15 | 5 |
| 05 | ON | 120 | 30 | 50 |
| ... | ... | ... | ... | ... |

FIG. 15

24: COMPUTATION NODE MANAGEMENT TABLE

| COMPUTATION NODE | IN-EXECUTION | STANDBY | NORMAL | POWER SAVING | UPDATE TIME |
|---|---|---|---|---|---|
| 01 | ON | 80 | 110 | 10 | 10:22:25 |
| 02 | ON | 80 | 100 | 20 | 10:22:24 |
| 03 | OFF | 150 | 40 | 10 | 10:22:23 |
| 04 | OFF | 180 | 15 | 5 | 10:22:24 |
| 05 | ON | 120 | 30 | 50 | 10:22:26 |
| ... | ... | ... | ... | ... | ... |

APPARATUS AND METHOD OF ASSIGNING JOBS TO COMPUTATION NODES BASED ON A COMPUTATION NODE'S POWER SAVING MODE TRANSITION RATE

CROSS-REFERENCE TO RELATED APPLICATION

This application is based upon the benefit of priority of the prior Japanese Patent Application No. 2008-067714, filed on Mar. 17, 2008, the entire contents of which are incorporated herein by reference.

FIELD

The embodiments discussed herein relates to an apparatus, a method, and a computer-readable medium for assigning jobs to a plurality of computation nodes.

BACKGROUND

There is an information processing system of which a housing is equipped with a plurality of computation nodes including CPUs (Central Processing Units) on a one-by-one basis in order to perform a business-oriented computing process and a research-oriented computing process in parallel at a high speed. In this type of information processing system, jobs inputted by an operator are accumulated in a queue, then taken one by one out of the queue, subsequently assigned to unoccupied computation nodes, and thus executed.

By the way, when a temperature of the CPU itself rises, a fault rate of the CPU increases, and power consumption also rises. Hence, some of the CPUs have an overheat prevention function for protecting the CPUs themselves. The overheat prevention function is that the CPU, when its temperature rises, reduces a clock count and a pipeline count by making an operation mode transition to a power saving mode from a normal mode, and thus restrains the power consumption down to a minimum level, thereby cooling the CPU itself. Each of the computation nodes within the information processing system described above can be configured to include the CPU having the overheat prevention function.

If a scheme is that jobs are simply assigned to the unoccupied computation nodes, however, the jobs are concentrated on the specified computation node in such a case that the CPUs of all of the computation nodes within the information processing system have the overheat prevention functions, it happens that a temperature of the CPU of the job-concentrated computation node rises. The job-concentrated computation node has a high frequency that the CPU transitions to the power saving mode, and hence, when examining the whole information processing system, there exists a possibility that execution efficiency decreases due to the overheat prevention functions held by the CPUs.

Note that generally a greater quantity of heat stagnates on the upper side than on the lower side within the housing of the information processing system, and therefore the computation nodes installed on the upper side have a high possibility that the CPUs thereof transition to the power saving mode. Such being the case, a thinkable scheme is that the upper side is cooled more intensively than on the lower side within the housing by adequately disposing cooling means such as a fan and an air conditioner in a way that estimates a temperature distribution within the housing.

It is, however, known that the CPUs manufactured based on a process rule on the order of 90 nm or 65 nm in recent years (which is also referred to as a manufacturing process and represents micronization of wiring of an integrated circuit) are classified in terms of their electric structures into those easy to get heated and those hard to get heated, and it is presumed that a decrease in the execution efficiency of the information processing system can not be thoroughly restrained simply by cooling intensively the upper side within the housing.

Under such circumstances, eventually the conventional information processing system has nothing but to cool the interior of the housing more than needed in order for the CPUs of all of the computation nodes not to transition to the power saving mode. Note that a cost for cooling the CPU has a tendency of rising exponentially corresponding to a level of a CPU packaging density, and a cost for cooling the whole information processing system sharply increases simply by giving a slight allowance to a cooling capability if the information processing system has the high CPU packaging density.

[Patent document 1] Japanese Laid-Open Application Publication No. 2007-179437
[Patent document 2] Japanese Laid-Open Application Publication No. 2005-316764
[Patent document 3] Japanese Laid-Open Application Publication No. 2005-115956

SUMMARY

According to an aspect of the invention, a job assignment apparatus for assigning jobs to a plurality of computation nodes including CPUs each having an overheat prevention function of transitioning to a power saving mode for reducing power consumption, the apparatus comprises: a first calculating unit calculating a power saving mode transition rate of each of the computation nodes assigned none of the jobs when a new job is inputted; a specifying unit specifying, as a new job assignment target node, the computation node having a low power saving mode transition rate calculated by the first calculating unit; and an assigning unit assigning the new job to the computation node specified by the specifying unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a schematic diagram of a distance definition table.
FIG. 5 illustrates a schematic diagram of a computation node management table.

FIG. 15 illustrates a schematic diagram depicting a computation node management table in the second embodiment.

DESCRIPTION OF EMBODIMENTS

A distributed memory type parallel computation system for performing a business-oriented computing process and a research-oriented computing process in parallel at a high speed will be described with reference to the accompanying drawings by way of three examples as embodiments.

First Embodiment

Architecture

Figure 1:
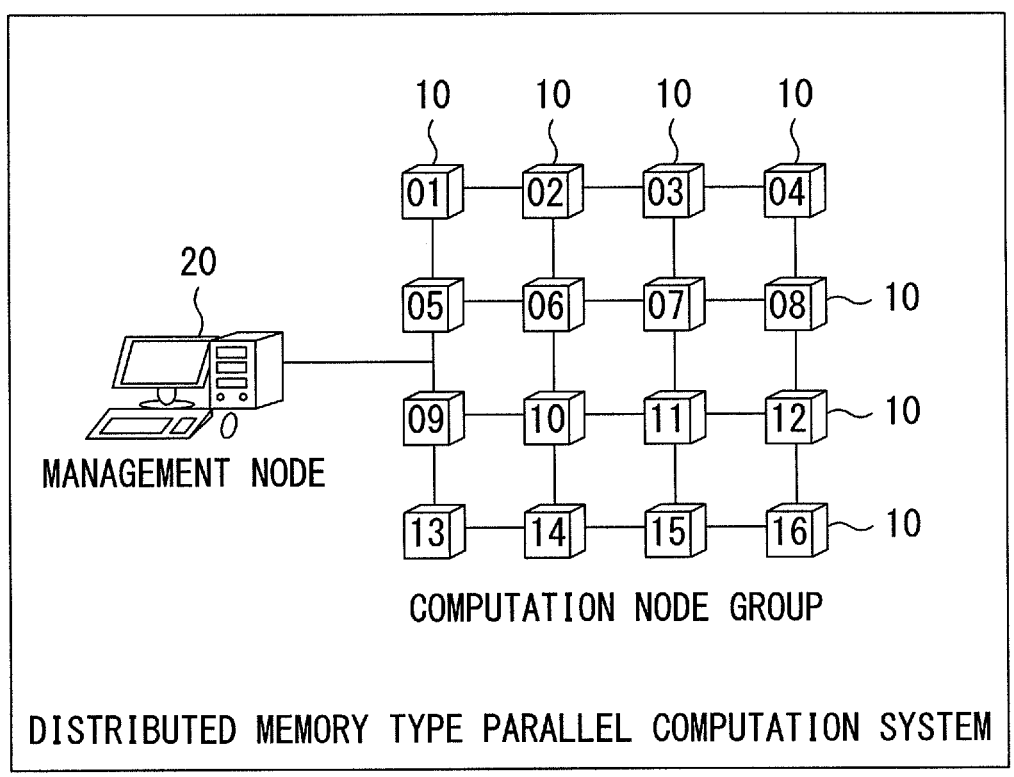
FIG. 1 illustrates a distributed memory type parallel computation system in a first embodiment.

FIG. 1 illustrates a diagram of a distributed memory type parallel computation system in a first embodiment.

As illustrated in FIG. 1, the distributed memory type parallel computation system in the first embodiment includes 16-pieces of computation nodes 10 and a single management node 20. The respective computation nodes 10 are connected in mesh in a (4×4) matrix form and are enabled to communicate with each other. Further, the computation nodes 10 are connected in a communication-enabled manner to the management node 20. Note that the number of the computation nodes 10 is set to "16" for the explanatory convenience in the first embodiment, which does not mean that effects of the first embodiment are acquired only when the node count is 16. As a matter of fact, any inconvenience may not be caused by setting the number of the computation nodes larger or smaller than 16.

Each of the computation nodes 10 is a computer for executing a job. Note that each of the computation nodes 10 is attached, as an index, with one of the numbers "01," through "16" in FIG. 1. These indexes are defined as unique pieces of identifying information for specifying the computation nodes 10. On the other hand, the management node 20 is a computer for accepting an input of the job from the operator, registering the job in a queue, assigning the jobs to the computation nodes 10, and outputting results of executing the jobs in the respective computation nodes 10.

Figure 2:
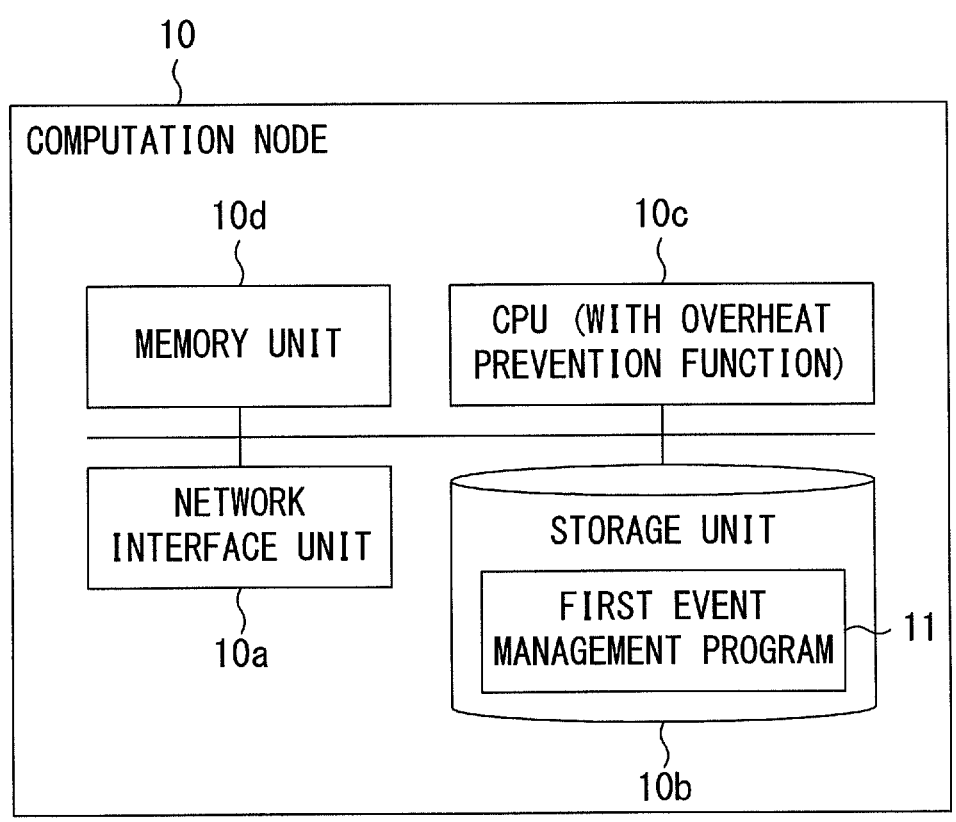
FIG. 2 illustrates a configuration of a computation node.

FIG. 2 illustrates a diagram of a configuration of the computation node 10.

As illustrated in FIG. 2, the computation node 10 includes at least a network interface unit 10a, a storage unit 10b, a CPU (Central Processing Unit) 10c, and a memory unit 10d.

The network interface unit 10a is a unit for transferring and receiving data to and from network interface units of other computation nodes 10 or a network interface unit of the management node 20. The network interface unit 10a is exemplified such as an Ethernet (trademark of Zerox Corp. in U.S.A.) unit.

The storage unit 10b is a unit for recording a variety of programs and data. The CPU 10c is a unit for executing processes according to the programs in the storage unit 10b. The memory unit 10d is a unit used for the CPU 10c to cache the programs and the data and to develop an operation area.

Note that the CPU 10c partly configuring the computation node 10 has a power consumption restraining function and an overheat prevention function in the first embodiment. The CPU 10c independently selects one type of operation mode from three types of operation modes, thereby utilizing these two types of functions. The three types of operation modes are a normal mode, a standby mode, and a power saving mode. The normal mode is the operation mode for utilizing the number of clock and the number of pipeline at the maximum without taking account of a quantity of power consumption. The standby mode and the power saving mode are the operation modes for restraining the quantity of power consumption down to the minimum level by reducing the number of clock and the number of the pipeline. The CPU 10c has a built-in intrinsic register that records operation mode information for specifying the type of the operation mode, and is configured to operate in the type of operation mode, which is specified by the operation mode information within the intrinsic register. Accordingly, switchover of the operation mode is utilized by updating the operation mode information in the intrinsic register.

Moreover, the CPU 10c has a built-in input/output monitor circuit which monitors whether an input and an output are given or not. In a case where the operation mode information in the intrinsic register indicates the normal mode, when the input/output monitor circuit detects that none of the input and the output are given for a fixed period of time and thereby causes a hardware interrupt, the CPU 10c rewrites the operation mode information in the intrinsic register into the operation mode information for specifying the standby mode according to an interrupt handler corresponding to the hardware interrupt. Further, in a case in which the operation mode information in the intrinsic register indicates the standby mode, when the input/output monitor circuit detects any input and output and thereby causes a hardware interrupt, the CPU 10c rewrites the operation mode information in the intrinsic register into the operation mode information for specifying the normal mode according to the interrupt handler corresponding to the hardware interrupt.

Further, the CPU 10c has a built-in temperature monitor circuit for monitoring a temperature of the CPU 10c itself. When the temperature monitor circuit detects that the temperature of the CPU 10c increases over a predetermined upper limit value and thereby causes a hardware interrupt, the CPU 10c rewrites the operation mode information in the intrinsic register into the operation mode information for specifying the power saving mode according to the interrupt handler corresponding to the hardware interrupt. Moreover, when the temperature monitor circuit detects that the temperature of the CPU 10c decreases under a predetermined lower limit value and thereby causes a hardware interrupt, the CPU 10c rewrites the operation mode information in the intrinsic register into the operation mode information for specifying the normal mode according to the interrupt handler corresponding to the hardware interrupt.

The storage unit 10b of the computation node 10 stores a communication interface program, though not illustrated. The communication interface program is a program for transferring and receiving the data to and from the communication interface programs of other computation nodes 10 or the communication interface program of the management node 20. The communication interface program is exemplified such as a TCP/IP (Transmission Control Protocol/Internet Protocol) stack and MPI (Message Passing Interface).

Further, the storage unit 10b of the computation node 10 stores a first event management program 11. The first event management program 11 is a program for monitoring an event occurring in the computation node 10 and for executing a process corresponding to the event. A content of a first event management process executed by the CPU 10c according to the first event management program 11 will be explained later on with reference to FIGS. 6 through 9.

Figure 3:
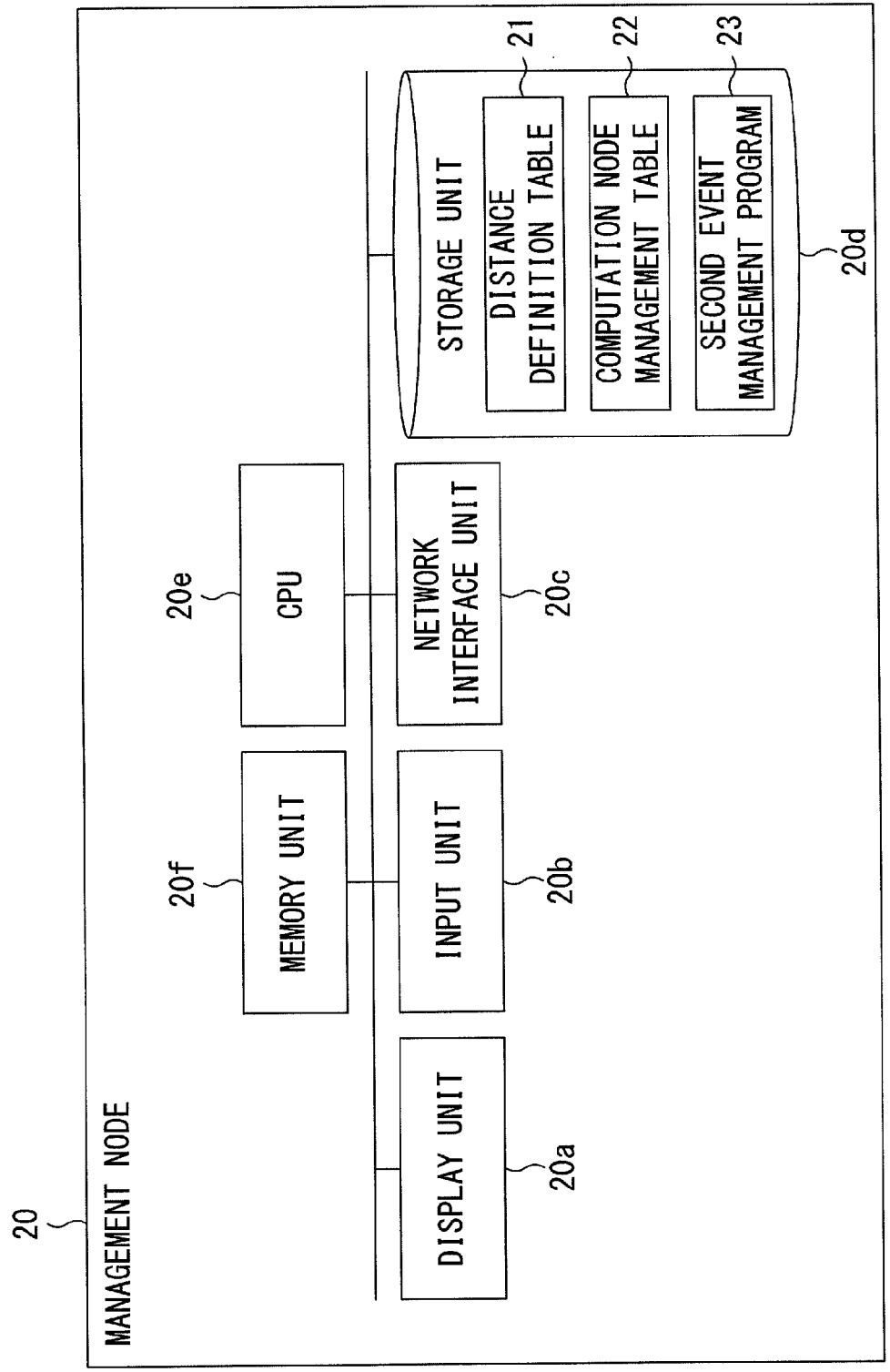
FIG. 3 illustrates a configuration of a management node.

FIG. 3 illustrates a diagram of a configuration of the management node 20.

As illustrated in FIG. 3, the management node 20 includes a display unit 20a such as a liquid crystal display, an input unit 20b such as a keyboard and a mouse, and a main body to which these units 20a, 20b are connected. The main body includes, as built-in components, at least a network interface unit 20c, a storage unit 20d, a CPU 20e, and a memory unit 20f. The respective units 20c-20f within the main body are units exhibiting the same functions as those of the units 10a-10d of the computation node 10.

The storage unit 20d of the management node 20 stores, though not illustrated, a communication interface program for transferring and receiving the data to and from the computation nodes 10.

Furthermore, a storage unit 20d of the management node 20 stores a distance definition table 21. The distance definition table 21 is a table in which to define a distance count (hop count) of the shortest route between the computation nodes 10 with respect to all of combinations in the case of extracting two pieces of computation nodes 10 from all of the computation nodes 10. Herein, the distance count connotes a hop count, the number of hops in other words, counted when hopping over the nodes along the shortest route from a certain computation node 10 to a target computation node 10, wherein a distance from a certain computation node 10 to a neighboring computation node 10 is set as one hop. In FIG. 1, the shortest route from the computation node 10 with the index "06" to the computation node 10 with the index "15" is a route extending from the computation node 10 with "10" to the computation node 10 with "14", or a route extending from the computation node 10 with "07" to the computation node 10 with "11". The hop count at this time is 3.

FIG. 4 illustrates a schematic diagram of the distance definition table 21.

As shown in FIG. 4, the distance definition table 21 is a (16×16) matrix table. Each of cells in the distance definition table 21 stores the distance count of the shortest route between the two computation nodes 10 specified by positions of the cells. If the 2-tuple computation nodes 10 are different in their indices, however, two cells that specify the 2-tuple computation nodes 10 may exist. Hence, the distance count is stored in one cell, while the other cell is blanked. Further, if the 2-tuple computation nodes 10 have the same index, the cells specifying the 2-tuple computation nodes 10 are likewise blanked. The distance takes a value obtained in a way that multiplies the hop count by 10 in the distance definition table 21.

Moreover, as shown in FIG. 3, the storage unit 20d of the management node 20 stores a computation node management table 22. The computation node management table 22 is a table for recording an execution status of each of the computation nodes 10 and a period of accumulating operation time in each operation mode.

FIG. 5 illustrates a schematic diagram of the computation node management table 22.

As shown in FIG. 5, the computation node management table 22 has the same number of records as the number of the computation nodes 10 within the distributed memory type parallel computation system. Each record has a "computation node" field, an "in-execution" field, a "standby" field, a "normal" field, and a "power saving" field. The "computation node" field is a field for recording identifying information of the computation node 10. The "in-execution" field is a field for recording with an in-execution flag indicating whether the computation node 10 executes a job or not. The in-execution flag represents that the job is now being executed when in an "ON" status. The "standby" field is a field for recording the accumulating operation time by way of, e.g., a value of seconds in the standby mode of the computation node 10. The "normal" field is a field for recording the accumulating operation time by way of, e.g., the value of seconds in the normal mode of the computation node 10. The "power saving" field is a field for recording the accumulating operation time by way of, e.g., the value of seconds in the power saving mode of the computation node 10.

Still further, as illustrated in FIG. 3, the storage unit 20d of the management node 20 stores a second event management program 23. The second event management program 23 is a program for monitoring the event occurring in the management node 20 and for executing a process corresponding to the event. A content of a second event management process executed by the CPU 20e according to the second event management program 23 will be explained later on with reference to FIGS. 10 through 12.

<<Process>>

In each computation node 10, when a main power source is switched ON, the CPU 10c reads the first event management program 11 from the storage unit 10b and starts executing the first event management process. Further, in the management node 20, when the main power source is switched ON, the CPU 20e reads the second event management program 23 from the storage unit 20d and starts executing the second event management process.

Incidentally, the first event management process and the second event management process are schemed to link up with each other in their steps. Therefore, the explanations of the first and second event management processes proceed in parallel.

Figure 6:
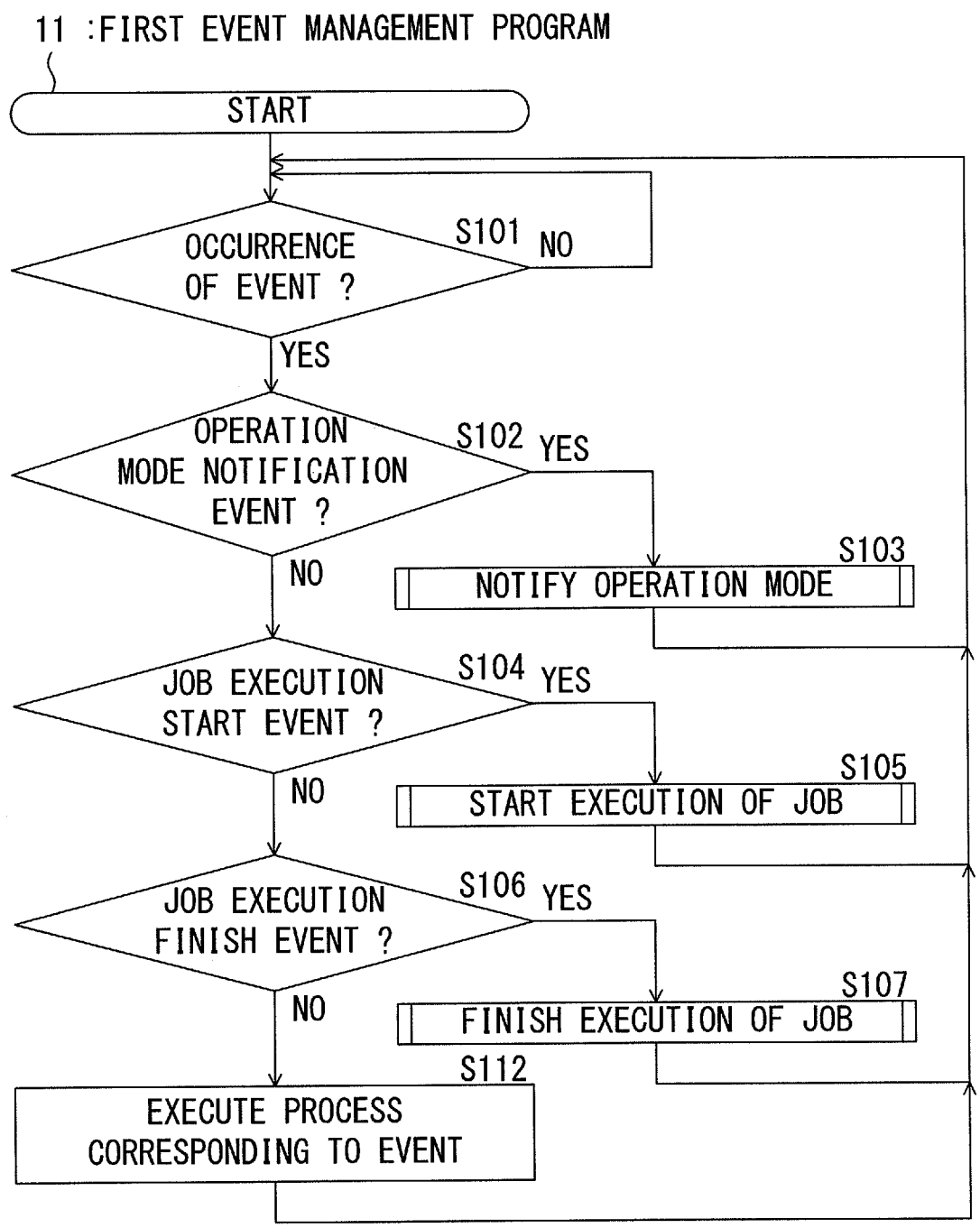
FIG. 6 illustrates a flowchart depicting a flow of a first event management process on the side of the computation node.
Figure 10:
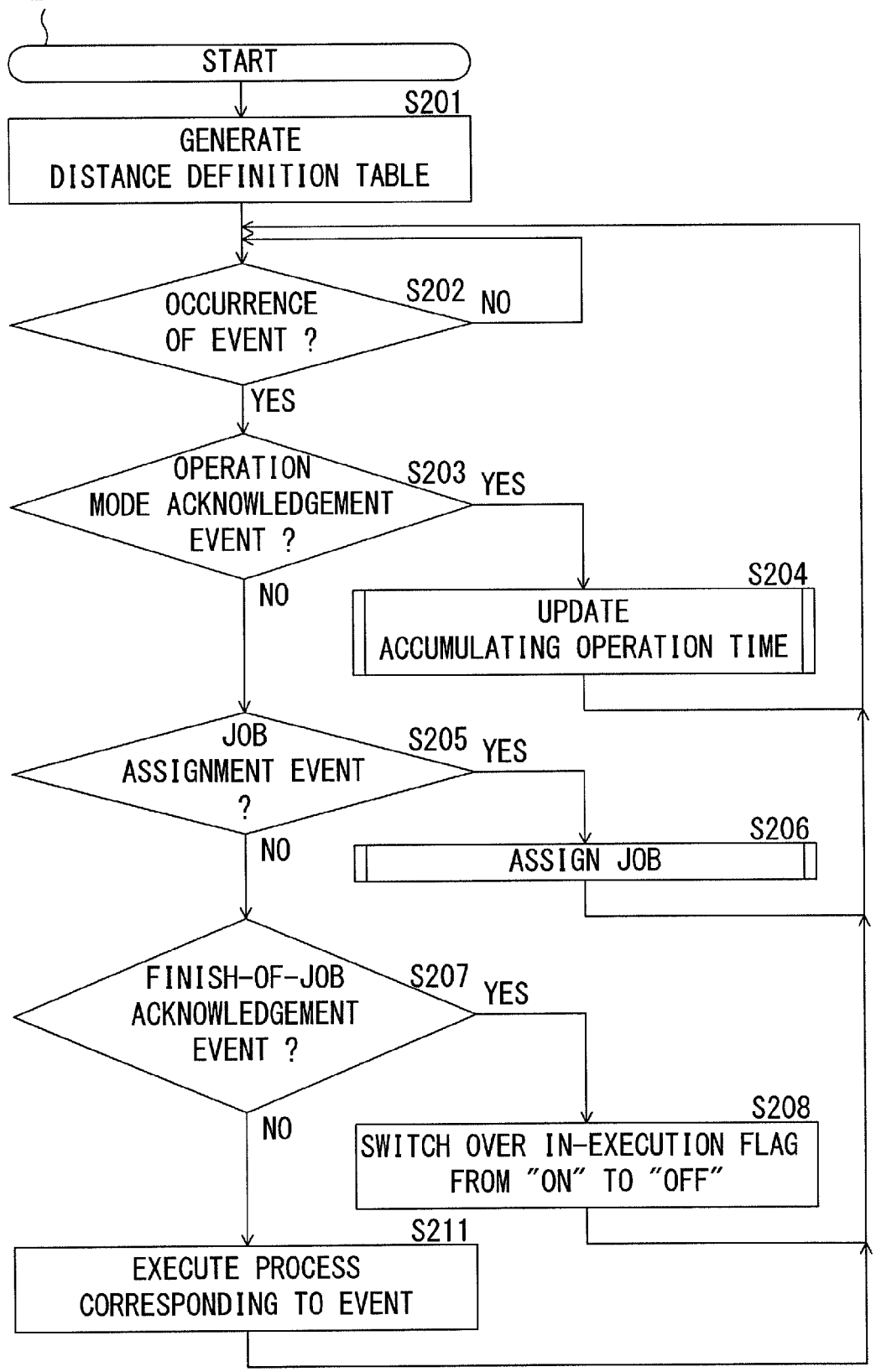
FIG. 10 illustrates a flowchart depicting a flow of a second event management process on the side of the management node.

FIG. 6 illustrates a flowchart depicting a flow of the first event management process on the side of the computation node 10. Further, FIG. 10 illustrates a flowchart depicting a flow of the second event management process on the side of the management node 20.

<Check of Operation Mode>

After the computation node 10 starts the first event management process (FIG. 6), in step S101, the CPU 10c stands by till some sort of event occurs. Then, when the event occurs, the CPU 10c advances the process to step S102.

In step S102, the CPU 10c determines whether the event detected in step S101 is an operation mode notification event or not. The operation mode notification event is periodically (e.g., at intervals of 10 sec) caused by the unillustrated program or hardware. Then, if the event detected in step S101 is the operation mode notification event, the CPU 10c diverts the process from step S102 to step S103.

In step S103, the CPU 10c executes an operation mode notification subroutine.

Figure 7:
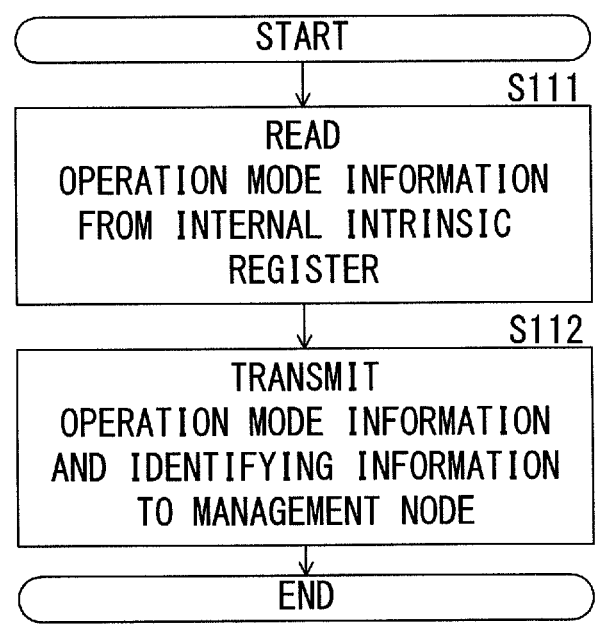
FIG. 7 illustrates a flowchart depicting a flow of an operation mode notification subroutine.

FIG. 7 illustrates a flowchart depicting a flow of the operation mode notification subroutine.

After starting the operation mode notification subroutine, in step S111, the CPU 10c reads the operation mode information for specifying the type of the operation mode from the internal intrinsic register.

In step S112, the CPU 10c transmits the operation mode information read in step S111 and the self-identifying information to the management node 20. After the transmission, the CPU 10c finishes the operation mode notification subroutine in FIG. 7 and, after looping the process back to step S101 in FIG. 6, reverts to the standby status till some sort of event occurs.

Corresponding to this operation, after the management node 20 starts the second event management process (FIG. 10), in step S201, the CPU 20e generates the distance definition table 21 illustrated in FIG. 4. A description of this table generating method is omitted. The CPU 20e, advances the process to step S202 when generating the distance definition table 21.

In step S202, the CPU 20e stands by till some sort of event occurs. Then, when some sort of event occurs, the CPU 20e advances the process to step S203.

In step S203, the CPU 20e determines whether the event detected in step S202 is an operation mode acknowledgement event or not. The operation mode acknowledgement event is defined as an interrupt event which occurs upon receiving the operation mode information and the identifying information transmitted in step S112 in FIG. 7 from any one of the computation nodes 10. Then, if the event detected in step S202 is the operation mode acknowledgement event, the CPU 20e diverts the process from step S203 to step S204.

In step S204, the CPU 20e executes an accumulating operation time update subroutine.

Figure 11:
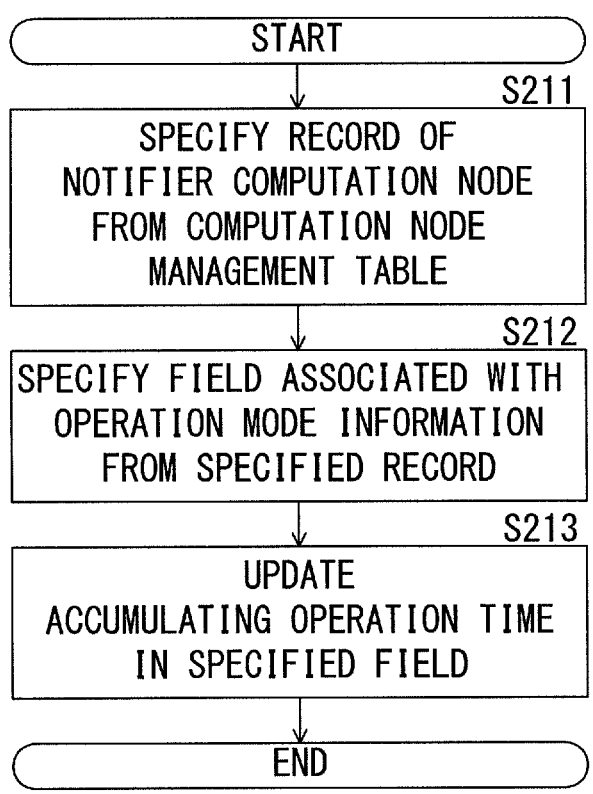
FIG. 11 illustrates a flowchart depicting a flow of an accumulating operation time update subroutine.

FIG. 11 illustrates a flowchart depicting a flow of the accumulating operation time update subroutine.

After starting the accumulating operation time update subroutine, in step S211, the CPU 20e specifies a record containing the identifying information received from the computation node 10 from the computation node management table 22 in FIG. 5.

In step S212, the CPU 20e specifies a field associated with the operation mode information received from the computation node 10 from the record specified in step S211.

In step S213, the CPU 20e adds a predetermined value to a value registered in the field specified in step S212, thus updating the accumulating operation time. Herein, the predetermined value takes the same value as the value of seconds (which is, in the example described above, 10 sec) of the time interval at which the operation mode notification event occurs in each computation node 10. Namely, the management node 20 presumes that each computation node 10 has been operating in such a type of operation mode as to be specified by the received operation mode information for a period tracing back to a time-point by this time interval from a time-point when receiving the operation mode information. The CPU 20e, after thus updating the accumulating operation time, terminates the accumulating operation time update subroutine in FIG. 11, then loops the process back to step S202 in FIG. 10, and reverts to the standby status till some sort of event occurs.

While on the other hand, in step S203, if the event detected in step S202 is not the operation mode acknowledgement event, the CPU 20e advances the process to step S205.

<Job Assignment>

In step S205, the CPU 20e determines whether the event detected in step S202 is a job assignment event or not. The jobs inputted by the operator via the input unit 20b and the unillustrated application are accumulated in an unillustrated queue, and this job assignment event is an interrupt event which occurs upon extracting one job as an execution target job through an unillustrated function from the jobs accumulated in the unillustrated queue. Then, if the event detected in step S202 is the job assignment event, the CPU 20e diverts the process from step S205 to step S206.

In step S206, the CPU 20e executes a job assignment subroutine.

Figure 12:
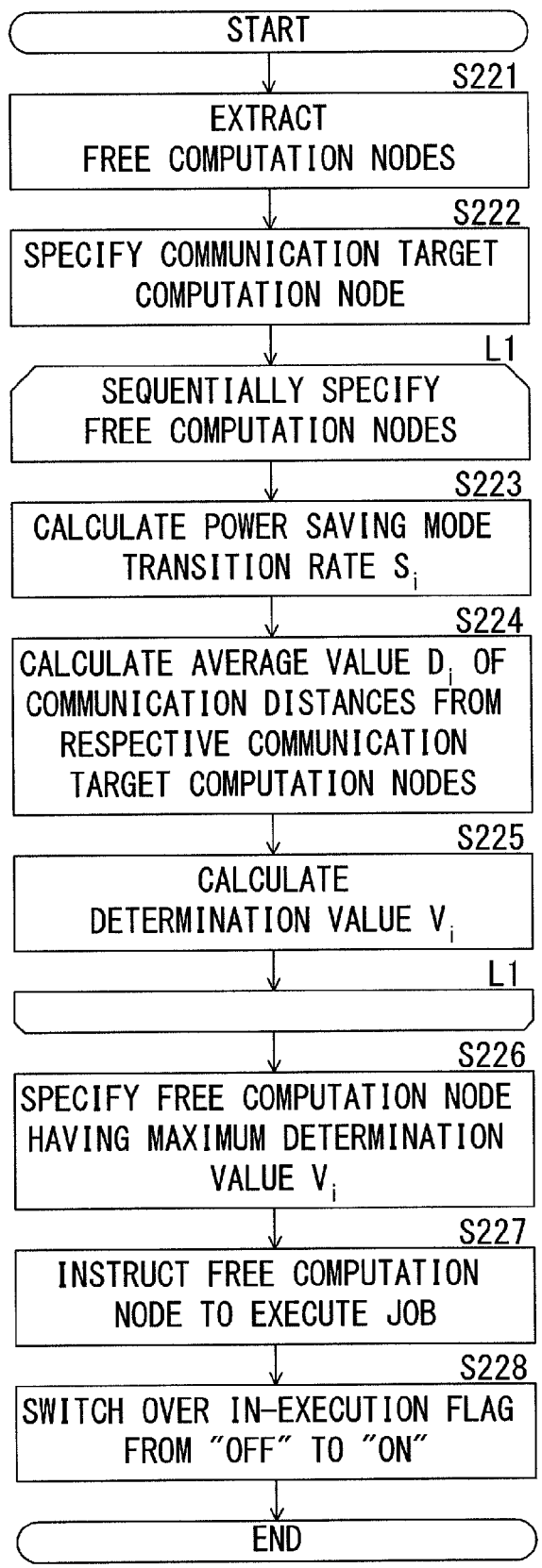
FIG. 12 illustrates a flowchart depicting a flow of a job assignment subroutine.

FIG. 12 illustrates a flowchart depicting a flow of the job assignment subroutine.

After starting the job assignment subroutine, in step S221, the CPU 20e refers to the value (the in-execution flag) in the "in-execution" field in the computation node management table 22 in FIG. 5, thereby extracting, as a free computation node, the computation node 10 executing none of the jobs from all of the computation nodes 10.

In step S222, the CPU 20e specifies, on the occasion of executing an execution target job, a communication target computation node 10 from the computation nodes 10, which have already executed the jobs. The computation node 10 is specified by applying a general method. For example, if the communication target computation node 10 is statically determined (the same computation node 10 is determined every time), the CPU 20e specifies the communication target computation node 10 by analyzing a source code or an execution object related to the execution target job. Further, if the communication target computation node 10 is dynamically determined (an arbitrary computation node 10 is determined every time), the CPU 20e properly selects the computation node 10 executing none of the jobs, then gets the selected computation node 10 to temporarily execute the execution target job and observes a communication pattern thereof, thereby specifying the communication target computation node 10.

The CPU 20e, when finishing executing step S221 and S222, carries out a first processing loop L1. In the first processing loop L1, the CPU 20e sequentially specifies the free computation nodes 10 extracted in step S221 on a one-by-one basis as processing target nodes, and executes a process including of steps S223 through S225 with respect to one free computation node 10 specified as the processing target node.

In step S223, the CPU 20e calculates a power saving mode transition rate $S_i$ with respect to the processing target free computation node 10. The CPU 20e reads the accumulating operation time in the normal mode and the accumulating operation time in the power saving mode from the record of the processing target computation node 10 in the computation node management table 22 in FIG. 5, and thereafter divides the accumulating operation time in the power saving mode by a total sum of the readout accumulating operation time, thereby calculating the power saving mode transition rate $S_i$. For example, if the computation node 10 with the index "03" is the processing target node, the accumulating operation time in the normal mode is 40 sec while the accumulating operation time in the power saving mode is 10 sec, which values are read from the computation node management table 22 in FIG. 5. In this case, the power saving mode transition rate $S_i$ is given by: 10/(40+10)=0.2.

It should be noted that the CPU 20e executing step S223 corresponds to the first calculating unit described above.

In step S224, the CPU 20e calculates an average value $D_i$ of the communication distances between the communication target computation node 10 which is specified in step S222 and the processing target free computation node 10. Specifically, the CPU 20e reads the distance between the communication target computation nodes 10 and the processing target free computation node 10 from the distance definition table 21 in FIG. 4, and thereafter divides a total sum of the readout distance by the number of the communication target computation nodes 10, thereby calculating the average value $D_i$. For example, if the communication target nodes are the computation nodes 10 having the indices "02", "05", "06", and "14" and the processing target node is the computation node 10 having the index "03", the distance between the processing target node and the communication target nodes are respectively 10, 30, 20, and 40, which values are read from the distance definition table 21 in FIG. 4. In this case, the average value $D_i$ is given by: (10+30+20+40)/4=25.

It should be noted that the CPU 20e executing in step S224 corresponds to a second calculating unit.

In step S225, the CPU 20e calculates a determination value $V_i$ with respect to the processing target free computation node 10. The determination value $V_i$ is calculated by the following formula (1).

[Mathematical Expression 1]

$$Vi = \sqrt{\frac{(1 - Si)^2 + (1.01^{-Di})^2}{2}} \quad (1)$$

The formula (1) signifies that $(1-S_i)$ and what 1.01 is exponentiated with power exponents of $-D_i$ are each squared, and further a square root of an arithmetic mean thereof is taken. Herein, $(1-S_i)$ is a reverse ratio of the power saving mode transition rate $S_i$ and, in other words, represents a normal mode residence rate. Further, what 1.01 is exponentiated (raised to) by the power of $-D_i$ takes a value that is in inverse proportion to the average value $D_i$.

The CPU 20e exits the first processing loop L1 after finishing calculating the determination value $V_i$ with respect to all of the free computation nodes 10 extracted in step S221, and advances the process to step S226.

In step S226, the CPU 20e specifies the free computation node 10 having the maximum determination value $V_i$ from the free computation nodes 10 extracted in step S221. Namely, supposing that the average value $D_i$ is fixed, the free computation node 10 having the minimum power saving mode transition rate $S_i$ is specified and, supposing that the power saving mode transition rate $S_i$ is fixed, the free computation node 10 having the minimum average value $D_i$ is specified.

It should be noted that the CPU 20e executing step S226 corresponds to the specifying unit described above.

In step S227, the CPU 20e assigns the execution target job to the free computation node 10 specified in step S226, and instructs this free computation node 10 to execute the job.

It should be noted that the CPU 20e executing step S227 corresponds to the assigning unit described above.

In step S228, the CPU 20e specifies the record of the free computation node 10 assigned the job from the records retained in the computation node management table 22 in FIG. 5, and switches over the in-execution flag in the "in-execution" field in the specified record to "ON" from "OFF". After the switchover of the in-execution flag, the CPU 20e terminates the job assignment subroutine in FIG. 12, then loops the process back to step S202 in FIG. 10, and reverts to the standby status till some sort of event occurs.

On the other hand, in step S102 in FIG. 6, if the event detected in the computation node 10 in step S101 is not the operation mode notification event, the CPU 10c advances the process to step S104.

In step S104, the CPU 10c determines whether the event detected in step S101 is a job execution start event or not. The job execution start event is the interrupt event that occurs upon accepting an instruction to execute the job in step S227 in FIG. 12. Then, if the event detected in step S101 is the job execution start event, the CPU 10c diverts the process from step S104 to step S105.

In step S105, the CPU 10c executes a job execution start subroutine.

Figure 8:
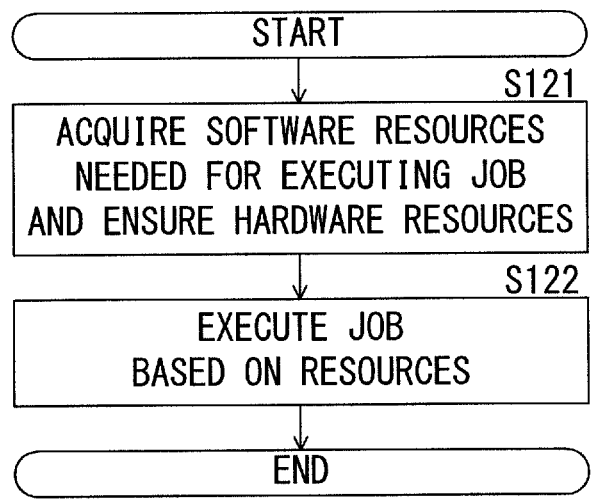
FIG. 8 illustrates a flowchart depicting a flow of a job execution start subroutine.

FIG. 8 illustrates a flowchart depicting a flow of the job execution start subroutine.

After starting the job execution start subroutine, in step S121, the CPU 10c acquires the software resources needed for executing the job from the management node 20 and ensures the hardware resources necessary for executing the job. Herein, the software resources include a program (a source code or an execution object) for executing the job, an input/output file, and communication setup information, while the hardware resources include a register and a memory space that are occupied for executing the job. The CPU 10c may acquire not the software resources themselves but pieces of information for specifying locations where the software resources exist from the management node 20 in step S121. In this case, the software resources existing locations are the storage unit 20d of the management node 20, the storage unit 10b of the computation node 10, or a storage device connected to the management node 20 via an unillustrated network.

In step S122, the CPU 10c starts executing the job based on the resources acquired in step S121. After the job is started, the CPU 10c terminates the job execution subroutine in FIG. 8, then loops the process back to step S101 in FIG. 6, and reverts to the standby mode till some sort of event occurs.

On the other hand, in step S104, if the event detected in step S101 is not the job execution start subroutine, the CPU 10c advances the process to step S106.

<End of Job>

In step S106, the CPU 10c determines whether the event detected in step S101 is a job execution finish event or not. The job execution finish event occurs upon finishing the execution of the job carried out by the CPU 10c in parallel with the program in FIG. 6. Then, if the event detected in step S101 is the job execution finish event, the CPU 10c diverts the process from step S106 to step S107.

In step S107, the CPU 10c executes a job execution finish subroutine.

Figure 9:
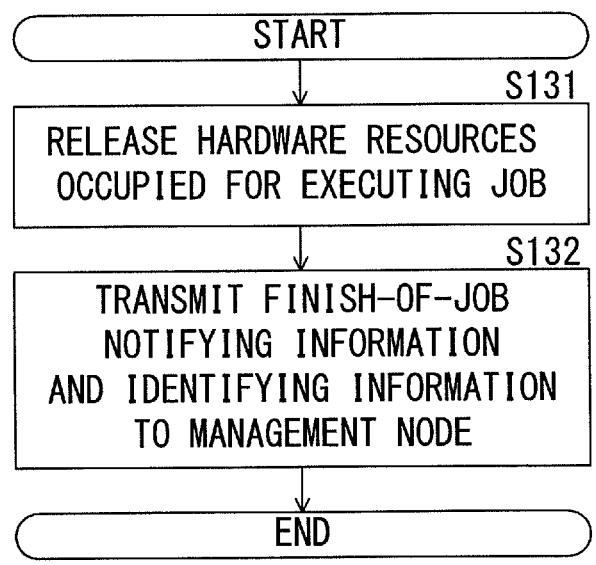
FIG. 9 illustrates a flowchart depicting a flow of a job execution finish subroutine.

FIG. 9 illustrates a flowchart depicting a flow of the job execution finish subroutine.

After starting the job execution finish subroutine, in step S131, the CPU 10c releases the hardware resources occupied for executing the job.

In step S132, the CPU 10c transmits finish-of-job notifying information indicating a purport that the execution of the job is finished and the self-identifying information to the management node 20. After the transmission, the CPU 10c terminates the job finish subroutine in FIG. 9, then loops the process back to step S101 in FIG. 6, and reverts to the standby mode till some sort of event occurs.

On the other hand, on the side of the management node 20, in step S205 in FIG. 10, if the event detected in step S202 is not the job assignment event, the CPU 20e advances the process to step S207.

In step S207, the CPU 20e determines whether the event detected in step S202 is a finish-of-job acknowledgment event or not. The finish-of-job acknowledgment event occurs upon receiving the finish-of-job notifying information and the identifying information, which are transmitted in step S132 in FIG. 9, from any one of the computation nodes 10. Then, if the event detected in step S202 is the finish-of-job acknowledgement event, the CPU 20e diverts the process from step S207 to step S208.

In step S208, the CPU 20e specifies the record containing the received identifying information from the records in the computation node management table 22 in FIG. 5, and switches over the in-execution flag in the "in-execution" field of the specified record from "ON" to "OFF". After the switchover of the in-execution flag, the CPU 20e loops the process back to step S202 and reverts to the standby mode till some sort of event occurs.

By contrast, in step S207, if the event detected in step S202 is not the finish-of-job acknowledgement event, the CPU 20e advances the process to step S211.

<Other Events>

In step S211, the CPU 20e executes a process corresponding to the event detected in step S202. After the execution of the process, the CPU 20e loops the process back to step S202 and reverts to the standby mode till some sort of event occurs.

On the other hand, on the side of the computation node 10, in step S106 in FIG. 6, if the event detected in step S101 is not the job execution finish event, the CPU 10c advances the process to step S112.

In step S112, the CPU 10c executes a process corresponding to the event detected in step S101. After the execution of the process, the CPU 10c loops the process back to step S101, and reverts to the standby mode till some sort of event occurs.

<<Operation>>

In the management node 20 according to the first embodiment, when extracting one job as the execution target job from the jobs accumulated in the unillustrated queue, a job assignment destination thereof is searched out (step S206, FIG. 11).

The management node 20, to begin with, extracts the free computation nodes 10 executing none of the jobs, and specifies the computation node 10 becoming the communication target node when executing the execution target job (step S212). Subsequently, the management node 20, with respect to all of the computation nodes 10 executing none of the jobs at that point in time, calculates the determination value $V_i$ based on the power saving mode transition rate $S_i$ and the average value $D_i$ of the distance counts from the communication target node (the first processing loop L1), and specifies the free computation node 10 having the maximum determination value $V_i$ as the execution target job assignment destination (step S216).

The determination value $V_i$ gets larger, as apparent from the formula (1), as the power saving mode transition rate $S_i$ gets smaller and as the average value $D_i$ of the distances from the communication target computation node 10 becomes smaller. Accordingly, the selection of the free computation node 10 having the maximum determination value $V_i$ as the job assignment destination implies the selection of the computation node 10 exhibiting a low frequency of the transition to the power saving mode and having the close proximity to the communication target node.

Thus, according to the first embodiment, a new job is substantially assigned not to the computation node 10 exhibiting the high frequency of the transition to the power saving mode but to the computation node 10 which is hard to transition to the power saving mode. Therefore, the jobs would not concentrated on the computation node 10 having an actual record of frequently transitioning to the power saving mode, and a possibility that a temperature of the CPU 10c of this computation node 10 rises decreases. As a result, examining the whole distributed memory type parallel computation system, almost no decrease occurs in the execution efficiency.

Further, according to the first embodiment, the new job is assigned to the computation node 10 proximal to the communication target node among the free computation nodes 10 having the low power saving mode transition rate $S_i$. Accordingly, the job execution efficiency is more improved than selecting the computation nodes 10 irrespective of the distance from the communication target node.

Second Embodiment

A second embodiment is different from the first embodiment in terms of a method of updating the accumulating operation time in each of the three types of operation modes.

<<Configuration and Process>>

As described above, the scheme in the first embodiment is that the CPU 10c, when the input/output monitor circuit or the temperature monitor circuit causes the occurrence of the hardware interrupt, updates the operation mode information within the internal intrinsic register according to the interrupt handler corresponding to the hardware interrupt. The second embodiment is slightly different from the first embodiment in terms of the content of the processing by the interrupt handler.

Figure 13:
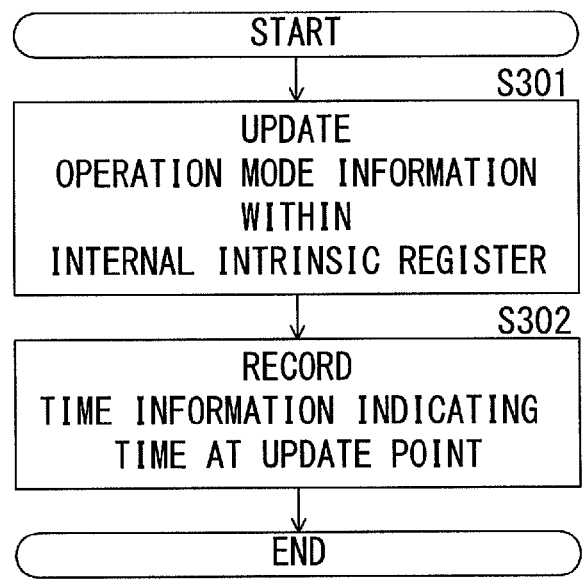
FIG. 13 illustrates a flowchart depicting a flow of an interrupt handler executed by a CPU of the computation node in a second embodiment.

FIG. 13 illustrates a flowchart depicting a flow of the interrupt handler executed by the CPU 10c of the computation node 10 in the second embodiment.

After starting up the interrupt handler, in step S301, the CPU 10c updates the operation mode information within the internal intrinsic register.

In step S302, the CPU 10c records time information indicating the time at this point in time into the internal intrinsic register or the memory unit 10d. After recording the time information, the CPU 10c terminates the process related to the interrupt handler.

Thus, the interrupt handler of the CPU 10c in the second embodiment is configured to not only update the operation mode information within the internal intrinsic register but also record the time information at an update point in time.

Further, the second embodiment is different from the first embodiment in terms of the content of the operation mode notification subroutine executed by the CPU 10c in step S103 in FIG. 6.

Figure 14:
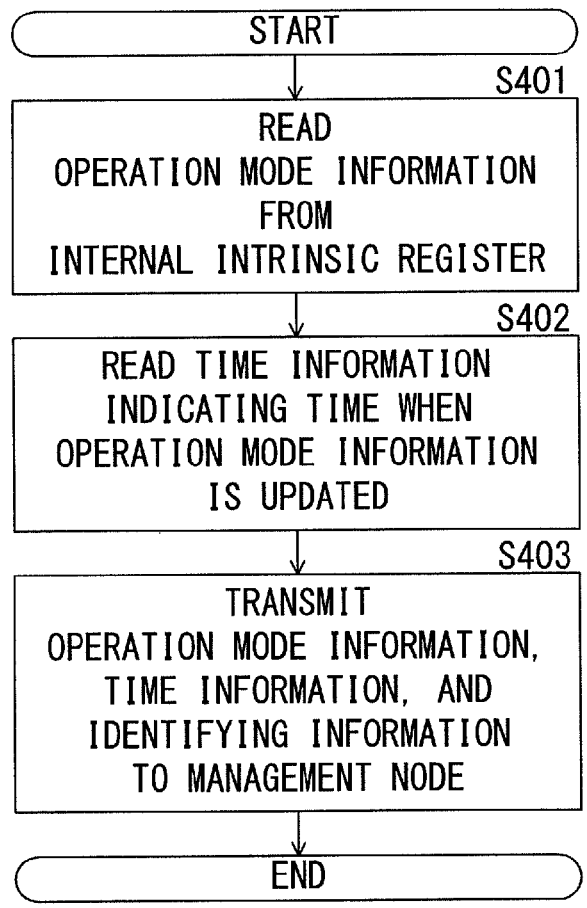
FIG. 14 illustrates a flowchart depicting a flow of the operation mode notification subroutine in the second embodiment.

FIG. 14 illustrates a flowchart depicting a flow of the operation mode notification subroutine in the second embodiment.

After starting the operation mode notification subroutine, in step S401, the CPU 10c reads the operation mode information for specifying the type of the operation mode from the internal intrinsic register.

In step S402, the CPU 10c reads the time information indicating the time at a time-point when the operation mode information within the internal intrinsic register is updated from the internal intrinsic register of the memory unit 10d.

In step S403, the CPU 10c transmits the operation mode information read in step S401, the time information read in step S402, and the self-identifying information to the management node 20. After transmitting these items of information to the management node 20, the CPU 10c finishes the operation mode notification subroutine in FIG. 14, then loops the process back to step S101 in FIG. 6, and reverts to the standby mode till some sort of event occurs.

Thus, according to the operation mode notification subroutine in the second embodiment, the time information as well as the operation mode information and the identifying information are transmitted to the management node 20.

Further, the second embodiment is different from the first embodiment in terms of the contents of the computation node management table 22 in FIG. 3 and the content of step S204 in FIG. 10.

FIG. 15 illustrates a schematic diagram of a computation node management table 24 in the second embodiment.

As illustrated in FIG. 15, each of the records in the computation node management table 24 according to the second embodiment has the "computation node" field, the "in-execution" field, the "standby" field, the "normal" field, the "power saving" field, and an "update time" field. In the second embodiment, the computation node management table 24 has an "update time" field. The "update time" field is a field for recording time information transmitted from the computation nodes 10 specified by the identifying information.

Figure 16:
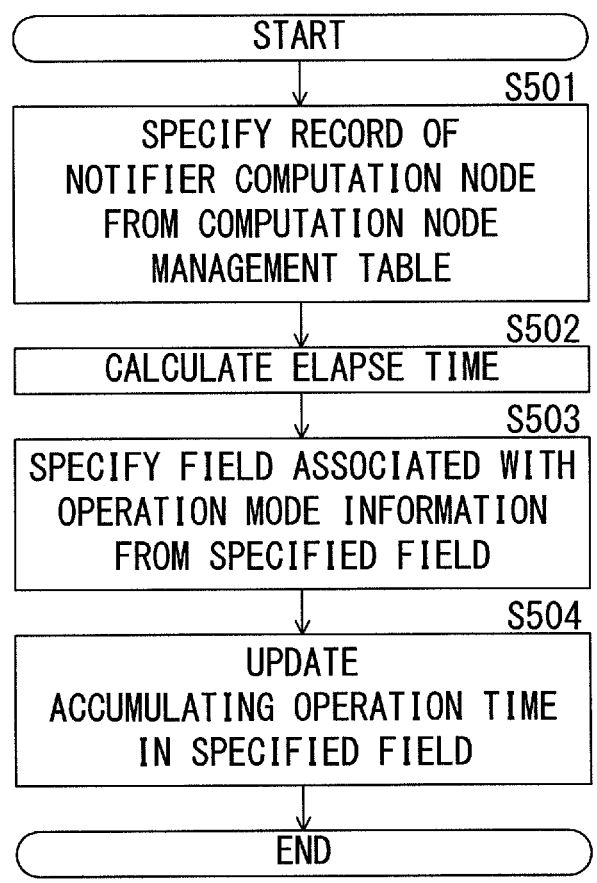
FIG. 16 illustrates a flowchart depicting a flow of an accumulating operation time update subroutine.

FIG. 16 illustrates a flowchart depicting a flow of an accumulating operation time update subroutine.

After starting the accumulating operation time update subroutine, in step S501, the CPU 20e specifies a record containing the identifying information received from the computation node 10 from the computation node management table 24 in FIG. 15.

In step S502, the CPU 20e calculates elapse time based on the value (time information) in the "update time" field of the record specified in step S501 and the time information received from the computation node 10.

In step S503, the CPU 20e specifies a field associated with the operation mode information received from the computation node 10 from the record specified in step S501.

In step S504, the CPU 20e adds the elapse time calculated in step S502 to the value in the field specified in step S503. After the addition of the elapse time, the CPU 20e terminates the accumulating operation time update subroutine in FIG. 16, then loops the process back to step S202 in FIG. 10, and reverts to the standby mode till some sort of event occurs.

Thus, according to the second embodiment, each computation node 10 notifies the management node 20 of not only the operation mode information but also operation mode switching time. Hence, the management node 20 can record the accumulating operation time in every operation mode in each computation node 10 more accurately than in the first embodiment.

Third Embodiment

A third embodiment is different from the first and second embodiments in terms of such a point that suitability of assigning the jobs to the computation nodes 10, which have already been assigned the jobs, is reexamined, and the jobs are reassigned to the nodes 10. An in-depth description of this different point will hereinafter be given.

<<Configuration and Process>>

Figure 17A:
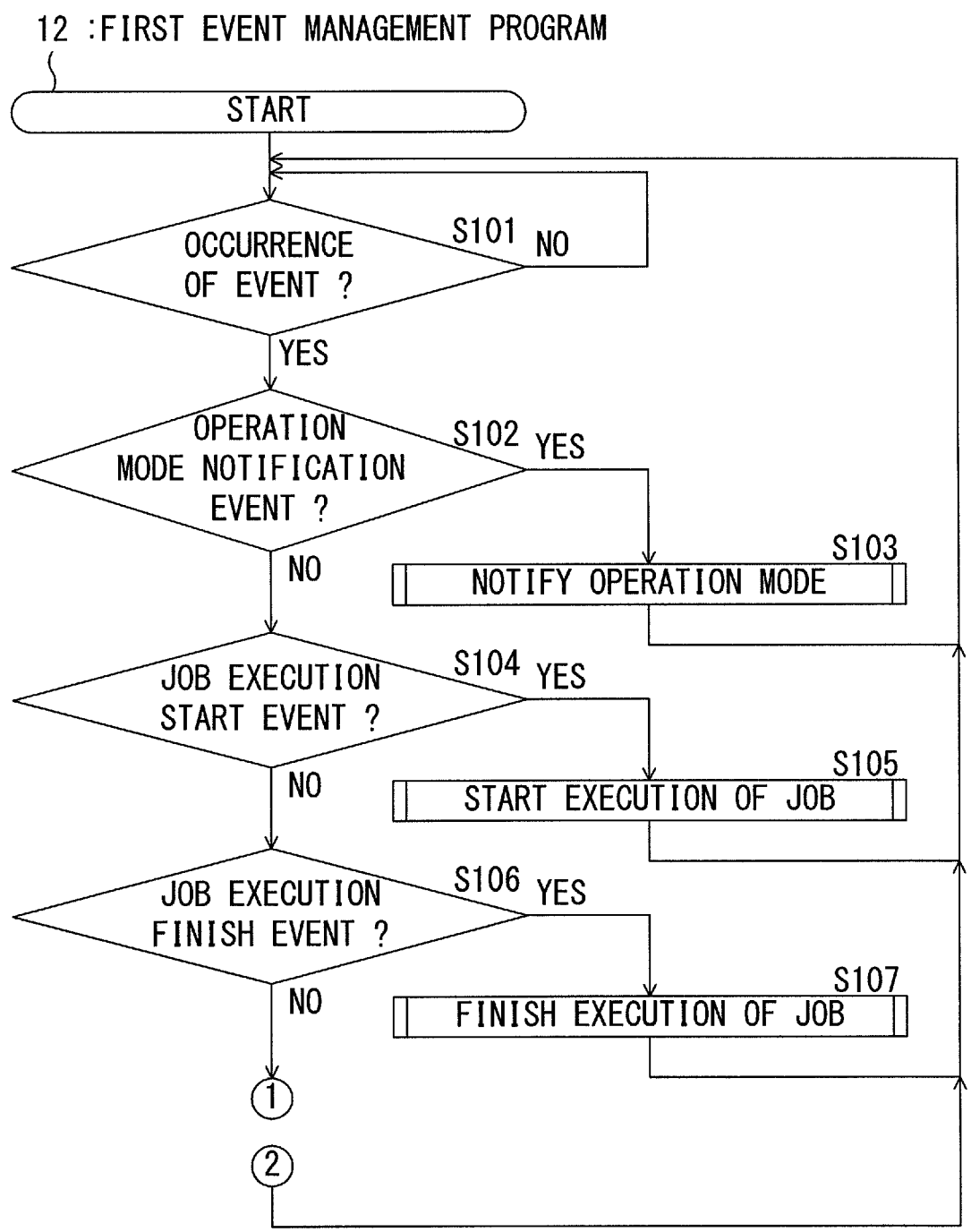
FIG. 17A illustrates a flowchart depicting a flow of a first event management process in a third embodiment.
Figure 17B:
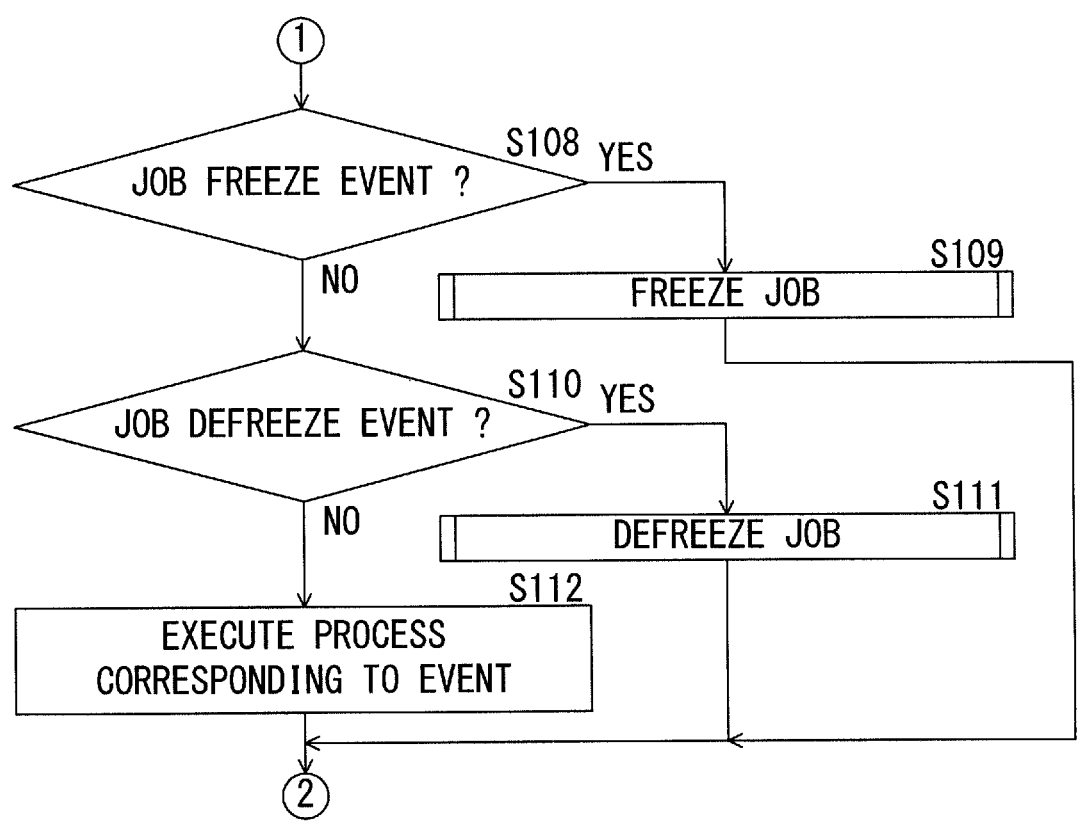
FIG. 17B illustrates a flowchart depicting the flow of the first event management process in a third embodiment.

FIGS. 17A and 17B illustrate flowcharts each depicting a flow of a first event management process executed by the CPU 10c in accordance with a first event management program 12 in the third embodiment. Further, FIGS. 20A and 20B illustrate flowcharts each depicting a flow of a second event management process executed by the CPU 20e in accordance with a second event management program 25 in the third embodiment.

According to the third embodiment, the first event management process and the second event management process are, in the same way as in the first embodiment, schemed to link up with each other in their steps. Therefore, the explanations of the first and second event management processes proceed in parallel.

As obvious from a comparison between FIGS. 17A and 17B and FIG. 6, steps S108 through S111 are added as functions related to the freezing of the job and the defreezing of the job to the first event management program 12 in the third embodiment, while other steps S101 through S107 and S112 are the same as those in the first event management program 11 according to the first and second embodiments. Therefore, the explanations of steps S101 through S107 and S112 in FIGS. 17A and 17B are omitted.

Figure 20A:
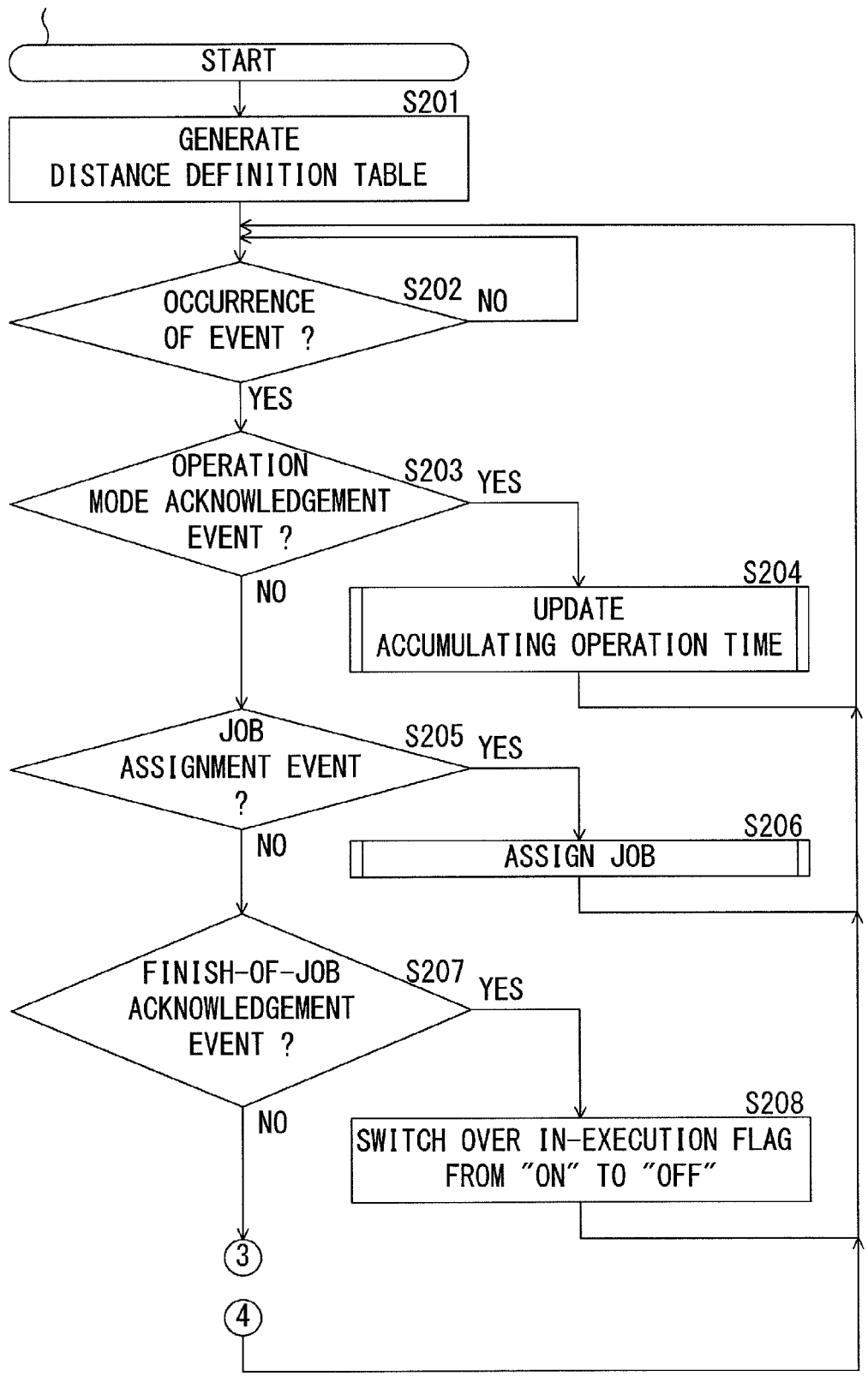
FIG. 20A illustrates a flowchart depicting a flow of a second event management process in the third embodiment.
Figure 20B:
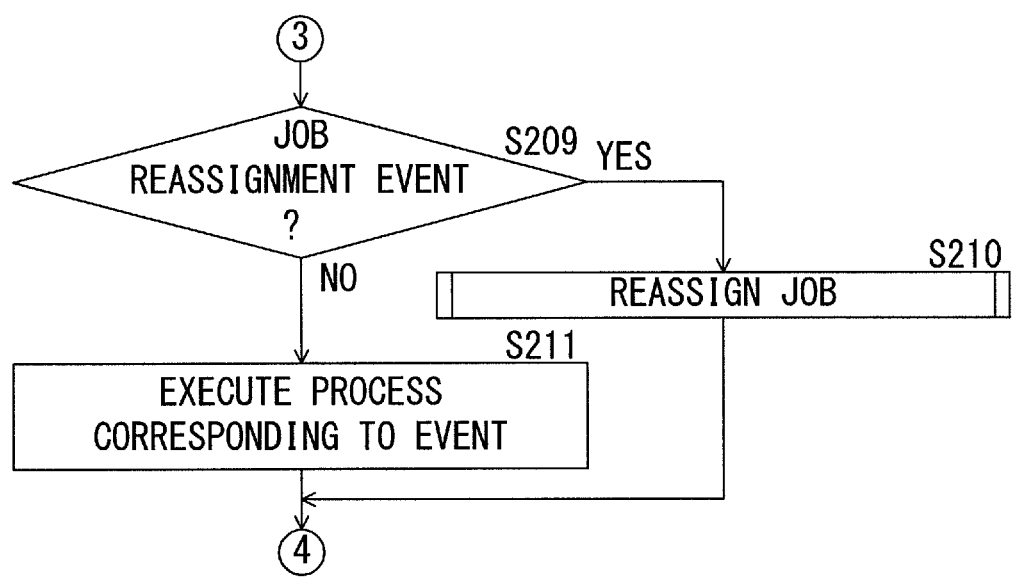
FIG. 20B illustrates a flowchart depicting the flow of the second event management process in the third embodiment.

Further, as apparent from a comparison between FIGS. 20A and 20B and FIG. 10, steps S209 and S210 are added as a function related to the reassignment of the job to the second event management program 25 in the third embodiment, while other steps S201 through S208 and S211 are the same as those in the first event management program 11 according to the first and second embodiments. Hence, the explanations of steps S201 through S208 and S211 in FIGS. 20A and 20B are omitted.

<Reassignment of Job>

In step S207 in FIG. 20A, if the event detected in the management node 20 in step S201 is not the finish-of-job acknowledgment event, the CPU 10c advances the process to step S209 in FIG. 20B.

In step S209, the CPU 10c determines whether or not the event detected in step S201 in FIG. 20A is a job reassignment event. The job reassignment event is an interrupt event which is periodically (e.g., at intervals of 10 sec) caused by the unillustrated predetermined program or hardware. Then, if the event detected in step S201 is the job reassignment event, the CPU 20e diverts the process from step S209 to step S210.

In step S210, the CPU 20e executes a job reassignment subroutine.

Figure 21A:
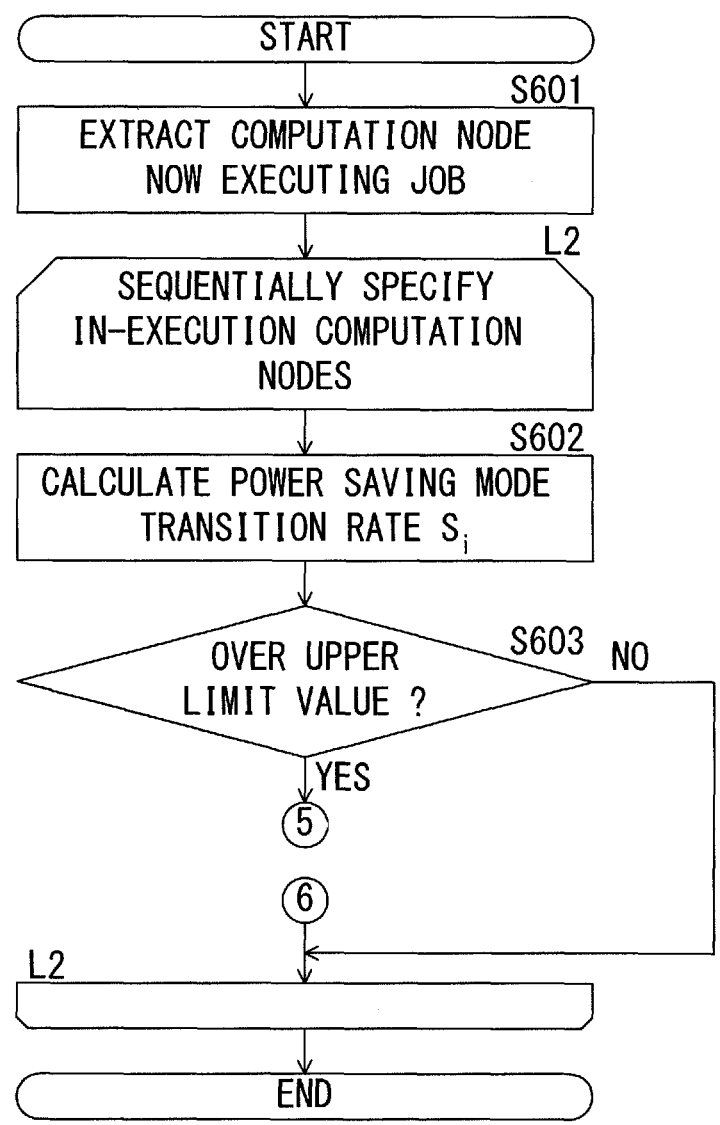
FIG. 21A illustrates a flowchart depicting a flow of a job reassignment subroutine.
Figure 21B:
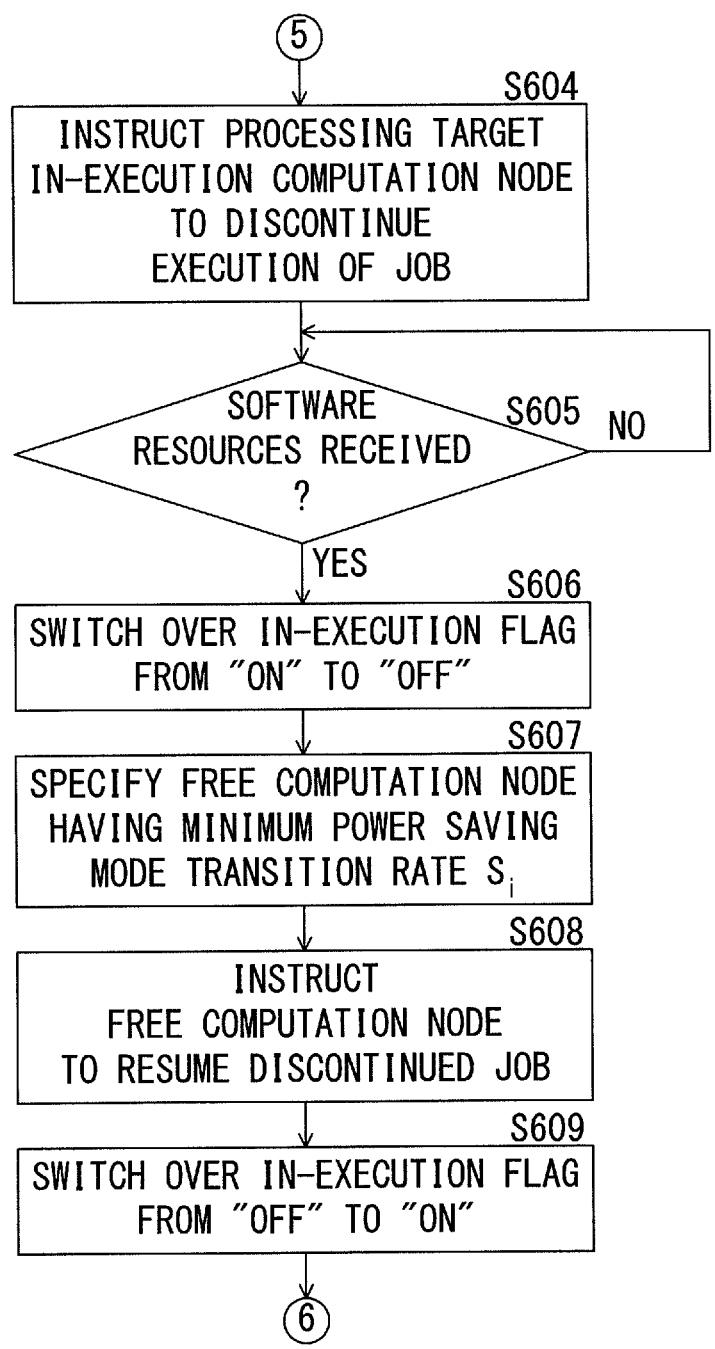
FIG. 21B illustrates a flowchart depicting the flow of the job reassignment subroutine.

FIGS. 21A and 21B illustrate flowcharts each depicting a flow of the job reassignment subroutine.

After starting the job reassignment subroutine, in step S601, the CPU 20e refers to the value (the in-execution flag) in the "in-execution" field in the computation node management table 22 in FIG. 5 (or the computation node management table 24 in FIG. 15), thereby extracting, as an in-execution computation node, the computation node 10 executing the job from all of the computation nodes 10.

The CPU 20e carries out a second processing loop L2 when finishing executing step S601. In the second processing loop L2, the CPU 20e sequentially specifies the in-execution computation nodes 10 extracted in step S601 on the one-by-one basis as the processing target nodes, and executes a process including steps S602 through S609 with respect to one in-execution computation node 10 specified as the processing target node.

In step S602, the CPU 20e calculates the power saving mode transition rate $S_t$ with respect to the processing target in-execution computation node 10. The method of calculating the power saving mode transition rate $S_t$ has been described earlier, and hence its explanation is omitted.

It should be noted that the CPU 20e executing in step S602 corresponds to a third calculating unit.

In step S603, the CPU 20e determines whether or not the power saving mode transition rate $S_t$ calculated in step S602 exceeds a predetermined upper limit value. Then, if the power saving mode transition rate $S_i$ calculated in step S602 does not exceed the predetermined upper limit value, the CPU 20e diverts the process from step S603, and finishes a turn of the processing target in-execution computation node 10 in the second processing loop L2. Whereas if the power saving mode transition rate $S_i$ calculated in step S602 exceeds the predetermined upper limit value, the CPU 20e advances the process to step S604 in FIG. 21B.

In step S604, the CPU 20e instructs the processing target in-execution computation node 10 to discontinue the job and thereafter advances the process to step S605.

By contrast, in the computation node 10, if the event detected in step S106 in FIG. 17A is not the job execution finish event, the CPU 10c advances the process to step S108 in FIG. 17B.

In step S108, the CPU 10c determines whether the event detected in step S101 is a job freeze event or not. The job freeze event is an interrupt event which occurs upon receiving the job discontinuing instruction from the management node 20. Then, if the event detected in step S101 is the job freeze event, the CPU 10c diverts the process from step S108 to step S109.

In step S109, the CPU 10c executes a job freeze subroutine.

Figure 18:
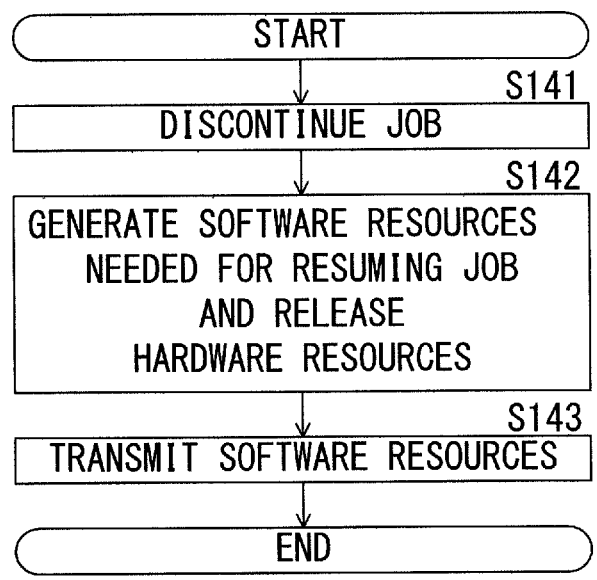
FIG. 18 illustrates a flowchart depicting a flow of a job freeze subroutine.

FIG. 18 illustrates a flowchart depicting a flow of the job freeze subroutine.

After starting the job freeze subroutine, in step S141, the CPU 10c discontinues the job.

In step S142, the CPU 10c generates the software resources used when resuming the job discontinued in step S141, and releases the hardware resources used for this job. As described above, the software resources include the program for executing the job, the input/output file, and the communication setup information, while the hardware resources include the register and the memory space that are occupied for executing the job.

In step S143, the CPU 10c transmits the software resources generated in step S142 to the management node 20. Thereafter, the CPU 10c terminates the job freeze subroutine in FIG. 18, then loops the process back to step S101 in FIG. 17A, and reverts to the standby mode till some sort of event occurs.

On the other hand, on the side of the management node 20, the CPU 20e stands by in step S605 in FIG. 21B till the software resources related to the job are received from the computation node 10 giving the job discontinuing instruction in step S604. Then, when receiving the software resources from the computation node 10, the CPU 20e advances the process to step S606.

In step S606, the CPU 20e specifies a record of the processing target in-execution computation node 10 from the records of the computation node management table 22 in FIG. 5 (or the computation node management table 24 in FIG. 15), and switches over the in-execution flag in the "in-execution" field of the specified record from "ON" to "OFF". After the switchover, the CPU 20e advances the process to step S607.

In step S607, the CPU 20e refers to the value (the in-execution flag) in the "in-execution" field in the computation node management table 22 in FIG. 5 (or the computation node management table 24 in FIG. 15), thereby extracting, as the free computation node, the computation node 10 executing none of the jobs from all of the computation nodes 10. Subsequently, the CPU 20e calculates the power saving mode transition rate $S_i$ with respect to each of the free computation nodes 10, and thereafter specifies the free computation node 10 having the minimum power saving mode transition rate $S_i$.

In step S608, the CPU 20e instructs the free computation node 10 specified in step S607 to resume the job discontinued in step S604. It therefore follows that another computation node 10 resumes the discontinued job.

Note that the CPU 20e executing steps S603 through S608 corresponds to a reassigning unit.

In step S609, the CPU 20e specifies a record of the computation node 10 giving the job resuming instruction in step S608 from the records of the computation node management table 22 in FIG. 5 (or the computation node management table 24 in FIG. 15), and switches over the in-execution flag in the "in-execution" field of the specified record from "OFF" to "ON". After the switchover, the CPU 20e finishes the turn of the processing target in-execution computation node 10 in the second processing loop L2.

The CPU 20e, after finishing the process including steps S602 through S609 with respect to all of the in-execution computation nodes 10 extracted in step S601, exits the second processing loop L2, then terminates the job freeze subroutine in FIGS. 21A and 21B, and, in the wake of looping the process back to step S202 in FIG. 20A, reverts to the standby mode till some sort of event occurs.

Incidentally, in step S209 in FIG. 20B, if the event detected in step S202 in FIG. 20A is not the job reassignment event, the CPU 20e advances the process to step S211, then loops the process back to step S202 after executing the process corresponding to the event detected in step S202 in FIG. 20A, and reverts to the standby mode till some sort of event occurs.

On the other hand, on the side of the computation node 10, in step S108 in FIG. 17B, if the event detected in step S101 is not the job freeze event, the CPU 10c advances the process to step S110.

In step S110, the CPU 10c determines whether or not the event detected in step S101 is the job defreeze event. The job defreeze event is an interrupt event which occurs upon receiving the job resuming instruction from the management node 20. Then, if the event detected in step S101 is the job defreeze event, the CPU 10c diverts the process from step S110 to step S111.

In step S111, the CPU 10c executes the job defreeze subroutine.

Figure 19:
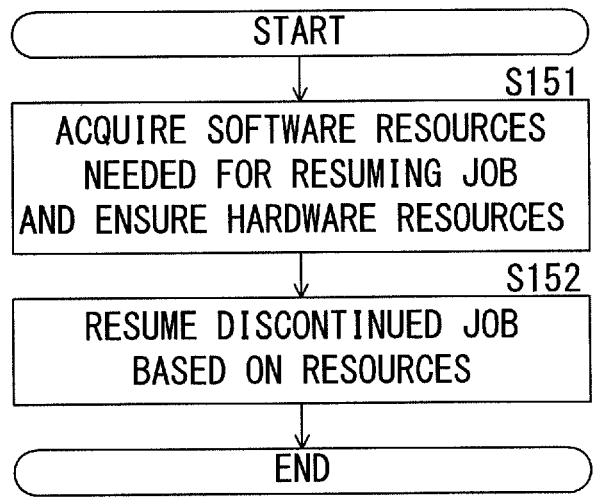
FIG. 19 illustrates a flowchart depicting a flow of a job defreeze subroutine.

FIG. 19 illustrates a flowchart depicting a flow of the job defreeze subroutine.

After starting the job defreeze subroutine, in step S151, the CPU 10c acquires the software resources needed for resuming the job from the management node 20 and ensures the hardware resources necessary for resuming the job.

In step S152, the CPU 10c starts the job based on the resources acquired in step S151. After the job is started, the CPU 10c terminates the job defreeze subroutine in FIG. 19, then loops the process back to step S101 in FIG. 17A, and reverts to the standby mode till some sort of event occurs.

Incidentally, in step S110 in FIG. 17B, if the event detected in step S101 in FIG. 17A is not the job defreeze event, the CPU 10c advances the process to step S112, then, after executing the process corresponding to the event detected in step S101, loops the process back to step S101 in FIG. 17A, and reverts to the standby mode till some sort of event occurs.

Thus, according to the third embodiment, in addition to assigning the new job to the computation node 10 exhibiting the low power saving mode transition rate $S_i$, even the job already assigned to the computation node 10 having the high power saving mode transition rate $S_i$ is assigned to the computation node 10 exhibiting the low power saving mode transition rate $S_i$. Hence, the possibility that the temperature of the CPU 10c of the computation node 10 exhibiting the high frequency of transitioning to the power saving mode rises further decreases. As a result, examining the whole distributed memory type parallel computation system, that almost no decrease occurs in the execution efficiency.

<Concerning Units>

In the first through third embodiments discussed above, each of the network interface unit 10a, the storage unit 10b, the CPU 10c, and the memory unit 10d of the computation node 10, and each of the display unit 20a, the input unit 20b, the network interface unit 20c, the storage unit 20d, the CPU 20e, and the memory unit 20f of the management node 20 may be configured by the software components and the hardware component, and may also be configured by only the hardware components.

The software components can be exemplified by the interface program, the driver program, the table, and the data and also a combination of some components. These software components may be those stored on a computer-readable medium which will be explained later on and may also be firmware fixedly installed into a storage device such as a ROM (Read Only Memory) and an LSI (Large Scale Integration).

Further, the hardware components can be exemplified by FPGA (Field Programmable Gate Array), ASIC (Application Specific Integrated Circuit), a gate array, a combination of logic gates, a signal processing circuit, an analog circuit, and other circuits. Among these hardware components, the logic gate may include AND, OR, NOT, NAND, NOR, a flip-flop, and a counter circuit. Still further, the signal processing circuit may include circuit elements for executing addition, multiplication, division (inversion), a sum-of-product operation, derivation, and integration. Yet further, the analog circuit may include circuit elements for executing amplification, the addition, the multiplication, the derivation, and the integration.

Note that the elements constituting the respective units 10a-10d of the computation node 10 described above and the elements constituting the individual units 20a-20f of the management node 20 explained above, are not limited to those exemplified above but may also be other element equivalent thereto.

<Concerning Software and Program>

In the first through third embodiments discussed above, each of the first event management programs 11, 12 in the computation node 10, each of the distance definition table 21, the computation node management tables 22, 24, and the second event management programs 23, 25 of the management node 20 and also the software elements described above, may include elements such as a software component, component by a procedure-oriented language, an object-oriented software component, a class component, a component managed as a task, a component managed as a process, a function, an attribute, procedures, a subroutine (software routine), a fragment or segment of a program code, a driver, firmware, a microcode, a code, a code segment, an extra segment, a stack segment, a program area, a data area, data, a database, a data structure, a field, a record, a table, a matrix table, an array, a variable, and a parameter.

Moreover, each of the first event management programs 11, 12 in the computation node 10, each of the distance definition table 21, the computation node management tables 22, 24, and the second event management programs 23, 25 of the management node 20 and also the software elements described above, may also be what is described by a C language, C++, Java (Trademark of Sun Microsystems, Inc. in U.S.A.), Visual Basic (Trademark of Microsoft Corp. in U.S.A.), Perl, Ruby, and other many programming languages.

Furthermore, the instructions, the codes, and the data, which are contained in the first event management programs 11, 12 of the computation node 10, the distance definition table 21, the computation node management tables 22, 24, and the second event management programs 23, 25 of the management node 20 and also the software elements, may be transmitted to or loaded into, via a wired network card and a wired network or via a wireless card and a wireless network, a computer or a computer incorporated into a machine or a device.

In the transmission or the loading described above, the data signals are embodied as, e.g., carrier waves and thus migrated across the wired network or the wireless network. The data signals may, however, be transferred directly as so-called baseband signals without depending on the carrier waves described above. These carrier waves are transmitted in an electric form, a magnetic form, an electromagnetic form, an optical form, an acoustic form, or other forms.

Herein, the wired network or the wireless network includes, for example, a telephone line, a network line, a cable (including an optical cable and a metallic cable), a wireless link, a mobile phone access line, a PHS (Personal Handyphone System) network, a wireless LAN (Local Area Network), Bluetooth (the trademark of the Bluetooth Special Interest Group) and on-vehicle wireless communications (DSRC (Dedicated Short Range Communication)), and a network configured by any one of these networks. Then, the information containing the instruction, the code, and the data is transmitted via the data signals to the nodes or the elements on the network.

It is to be noted that the elements configuring the first event management programs 11, 12 of the computation node 10, the distance definition table 21, the computation node management tables 22, 24, and the second event management programs 23, 25 of the management node 20 and also the software elements, are not limited to those exemplified above but may also be other elements equivalent thereto.

<Concerning Computer-Readable Medium>

Any one of the functions in the first through third embodiments discussed above may be coded and thus stored in a storage area on a computer-readable medium. In this case, a program for utilizing the function thereof can be provided, via the computer-readable medium, to the computer or to the computer incorporated into the machine or the device. The computer or the computer incorporated into the machine or the device reads the program from the storage area on the computer-readable medium and executes this program, whereby the function thereof can be utilized.

Herein, the computer-readable medium connotes a recording medium stored with the information such as the data and the programs by electric, magnetic, optical, chemical, physical, or mechanical action, and retains the information in a readable-by-computer status.

The electric or magnetic action can be exemplified by writing the data to the element on the ROM (Read Only Memory) including a fuse as a component. The magnetic or physical action can be exemplified by a phenomenon of toners for forming a latent image on a paper medium. Note that the information recorded on the paper medium can be, for instance, read optically. The optical and chemical action can be exemplified by forming a thin film or a rugged portion on a substrate. Incidentally, the information recorded in the rugged form can be, for example, read optically. The chemical action can be exemplified by oxidation-reduction reaction on the substrate or formation of an oxide film and formation of a nitride film or a photo resist phenomenon on the semiconductor substrate. The physical or mechanical action can be exemplified by formation of the rugged portion on an emboss card or formation of punch-holes in the paper medium.

Further, the computer-readable medium includes mediums detachably attached to the computer or the computer incorporated into the machine or the device. The attachable/detachable computer-readable medium can be exemplified by a DVD (Digital Versatile Disk) (including a DVD-R (Recordable), a DVD-ROM (Read Only Memory), a DVD-RAM (Random Access Memory), an HD (High Definition) DVD), +R/+WR, a BD (Blu-ray Disk) (including a BD-R, a BD-RE (Rewritable), a BD-ROM), a CD (Compact Disk) (including a CD-R, a CD-RW, a CD-ROM), an MO (Magneto Optical) disk, other optical disk mediums, a flexible disk, (including a floppy (the trademark of Hitachi, Ltd.), other magnetic disk mediums, a memory card (CompactFlash) (the trademark of Sandisk Corp., U.S.A.), SmartMedia (the trademark of Toshiba Co., Ltd.), SD Card (the trademark of Sandisk Corp., U.S.A., Matsushita Electric Industrial Co., Ltd., and Toshiba Co., Ltd.), Memory Stick (the trademark of Sony Corp.), MMC (the trademark of Siemens U.S.A. and SanDisk Corp., U.S.A.)), a magnetic tape, other tape mediums, and a storage device having any one of those exemplified above as a built-in component. The storage device includes those including a DRAM (Dynamic Random Access Memory) or an SRAM (Static Random Access Memory) as a built-in component.

Moreover, the computer-readable medium includes those fixedly mounted in the computer or the computer incorporated into the machine or the device. This type of computer-readable medium can be exemplified by the hard disk, the DRAM, the SRAM, the ROM, an EEPROM (Electronically Erasable and Programmable Read Only Memory), and the flash memory.

Furthermore, the computer-readable medium may also be embraced by the computer network systems linked up via the network. The information containing the instruction, the codes, and the data stored in this type of system is executed in a distributed processing environment.

With this configuration, it follows that the new job is assigned to the computation node, which is not yet assigned the job but exhibits a low power saving mode transition rate. In other words, not many jobs are assigned to the computation nodes each exhibiting a high frequency of transitioning to the power saving mode with the result that the jobs are not concentrated on these computation nodes, and consequently there decreases a possibility that a temperature of the CPU of each of these computation nodes rises.

It should be noted that in the job assignment apparatus described above, when the computation node exhibiting the high power saving mode transition rate exists in the computation nodes that have already been assigned the jobs, the job assigned to this computation node may be reassigned to the computation node not yet assigned any job and having a low power saving mode transition rate.

With this configuration, not only the new job but also the job already assigned to the computation node are assigned to the computation nodes each exhibiting the low power saving mode transition rate, and hence there decreases, it follows, the possibility that a temperature of a CPU of the computation node having a high frequency of transitioning to the power saving mode is reduced.

It should be noted that an operation according to the job assignment apparatus disclosed above can be utilized by a job assignment method or a job assignment program. Namely, an aspect of the present invention may also be a job assignment method by which a computer executes the same functions as those of respective units of the job assignment apparatus described above by way of a plurality of steps, and may further be the job assignment program for making the computer operate by way of a plurality of means functioning in the same way as the respective units function.

Therefore, according to the job assignment apparatus disclosed therein, even when each of the CPUs included in all of the computation nodes within the information processing system, the execution efficiency of the whole information processing system does not increase at a considerable level.

All examples and conditional languages recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relates to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A job assignment apparatus for assigning jobs to a plurality of computation nodes including CPUs each having a function of transitioning to a power saving mode for reducing power consumption, the apparatus comprising:
 a first calculating unit that calculates a power saving mode transition rate of each of the computation nodes that none of the jobs is assigned when a new job is inputted, wherein the power saving mode is an operation mode for restraining the quantity of power consumption down by reducing the number of pipelines, the power saving mode transition rate represents a ratio of operating time in the power saving mode to a total operating time of the CPUs;
 a specifying unit that specifies, as a new job assignment target node, the computation node having a low power saving mode transition rate calculated by the first calculating unit;
 an assigning unit that assigns the new job to the computation node specified by the specifying unit; and
 a second calculating unit that calculates, when the new job is inputted, an average of communication distances from communication target computation nodes for the new job with respect to the respective computation nodes assigned none of the jobs as an average communication distance,
 wherein the specifying unit specifies, as a new job assignment target node, the computation node exhibiting a low power saving mode transition rate calculated by the first calculating unit and a small average communication distance calculated by the second calculating unit.

2. The job assignment apparatus according to claim 1,
 wherein the specifying unit performs an operation of taking a square root of an arithmetic mean of a value obtained by subtracting the power saving mode transition rate from 1 and a value obtained by exponentiating a predetermined number with the average communication distance used as a power exponent, and specifies the computation node having a large value obtained as a result of this operation as the new job assignment target node.

3. The job assignment apparatus according to claim 1, further comprising:
 a third calculating unit that calculates the power saving mode transition rate with respect to each of one or more computation nodes assigned the jobs; and
 a reassigning unit that reassigns the job already assigned to the computation node having the high transition rate to the computation node assigned none of the jobs and exhibiting the low power saving mode transition rate when the computation node exhibiting the high power saving mode transition rate calculated by the third calculating unit exists in the computation nodes assigned the jobs.

4. The job assignment apparatus according to claim 3, wherein the reassigning unit specifies the computation node of which the power saving mode transition rate calculated by the third calculating unit exceeds a predetermined threshold value as the computation node exhibiting the high power saving mode transition rate.

5. A job assignment method for assigning jobs to a plurality of computation nodes including CPUs each having a function of transitioning to a power saving mode for reducing power consumption, a computer executing:

calculating a power saving mode transition rate of each of the computation nodes assigned none of the jobs when a new job is inputted, wherein the power saving mode is the operation mode for restraining the quantity of power consumption down by reducing the number of pipelines, the power saving mode transition rate represents a ratio of operating time in the power saving mode to a total operating time of the CPUs;

specifying the computation node having a low power saving mode transition rate as a new job assignment target node based on the calculation of the power saving mode transition rate;

assigning the new job to the specified computation node; and calculating an average of communication distances from communication target computation nodes for the new job with respect to the respective computation nodes that none of the jobs is assigned as an average communication distance, when the new job is inputted, wherein the specifying of the new job assignment target node includes specifying of the computation node exhibiting a low power saving mode transition rate and a small average communication distance.

6. The job assignment method according to claim 5, wherein the specifying of the new job assignment target node includes performing an operation of taking a square root of an arithmetic mean of a value obtained by subtracting the power saving mode transition rate from 1 and a value obtained by exponentiating a predetermined number with the average communication distance used as a power exponent, and specifies the computation node having a large value obtained as a result of this operation as the new job assignment target node.

7. The job assignment method according to claim 5, wherein the computer further executes:

calculating the power saving mode transition rate with respect to each of one or more computation nodes assigned the jobs; and reassigning, the job already assigned to the computation node having the high transition rate to the computation node assigned none of the jobs and exhibiting the low power saving mode transition rate when the computation node exhibiting the high power saving mode transition rate exists in the computation nodes assigned the jobs.

8. The job assignment method according to claim 7, wherein the reassigning of the job includes specifying the computation node of which the calculated power saving mode transition rate exceeds a predetermined threshold value as the computation node exhibiting the high power saving mode transition rate.

9. A non-transitory computer-readable medium encoded with a job assignment program for assigning jobs to a plurality of computation nodes including CPUs each having a function of transitioning to a power saving mode for reducing power consumption, the program making a computer function as an apparatus comprising:

a first calculating unit that calculates a power saving mode transition rate of each of the computation nodes assigned none of the jobs when a new job is inputted, wherein the power saving mode is the operation mode for restraining the quantity of power consumption down by reducing the number of pipelines, the power saving mode transition rate represents a ratio of operating time in the power saving mode to a total operating time of the CPUs;

a specifying unit that specifies, as a new job assignment target node, the computation node having a low power saving mode transition rate calculated by the first calculating unit;

an assigning unit that assigns the new job to the computation node specified by the specifying unit; and a second calculating unit that calculates, when the new job is inputted, as an average communication distance, an average of communication distances from communication target computation nodes for the new job with respect to the respective computation nodes assigned none of the jobs, wherein the specifying unit specifies, as a new job assignment target node, the computation node exhibiting a low power saving mode transition rate calculated by the first calculating unit and a small average communication distance calculated by the second calculating unit.

10. The non-transitory computer-readable medium according to claim 9, wherein the specifying unit performs an operation of taking a square root of an arithmetic mean of a value obtained by subtracting the power saving mode transition rate from 1 and a value obtained by exponentiating a predetermined number with the average communication distance used as a power exponent, and specifies the computation node having a large value obtained as a result of this operation as the new job assignment target node.

11. The non-transitory computer-readable medium according to claim 9, the apparatus further comprising:

a third calculating unit that calculates the power saving mode transition rate with respect to each of one or more computation nodes assigned the jobs; and a reassigning unit that reassigns, when the computation node exhibiting the high power saving mode transition rate calculated by the third calculating unit exists in the computation nodes assigned the jobs, the job already assigned to the computation node having the high transition rate to the computation node assigned none of the jobs and exhibiting the low power saving mode transition rate.

12. The non-transitory computer-readable medium according to claim 11, wherein the reassigning unit specifies the computation node of which the power saving mode transition rate calculated by the third calculating unit exceeds a predetermined threshold value as the computation node exhibiting the high power saving mode transition rate.

* * * * *